US008138244B2

(12) United States Patent
Ding et al.

(10) Patent No.: US 8,138,244 B2
(45) Date of Patent: Mar. 20, 2012

(54) REINFORCED POLYESTER COMPOSITIONS, METHOD OF MANUFACTURE, AND ARTICLES THEREOF

(75) Inventors: Tianhua Ding, Evansville, IN (US); Sung Dug Kim, Newburgh, IN (US)

(73) Assignee: Sabic Innovative Plastics IP B.V. (NL)

( * ) Notice: Subject to any disclaimer, the term of this patent is extended or adjusted under 35 U.S.C. 154(b) by 428 days.

(21) Appl. No.: 12/346,138

(22) Filed: Dec. 30, 2008

(65) Prior Publication Data
US 2010/0168290 A1 Jul. 1, 2010

(51) Int. Cl.
C08K 3/40 (2006.01)
C08K 5/5313 (2006.01)
C08K 5/5373 (2006.01)
C08K 5/34 (2006.01)
C08J 11/04 (2006.01)

(52) U.S. Cl. ........... 524/100; 524/126; 524/494; 521/48
(58) Field of Classification Search ............. 524/100, 524/126, 494; 521/48
See application file for complete search history.

(56) References Cited

U.S. PATENT DOCUMENTS

| | | | |
|---|---|---|---|
| 2,720,502 A | 10/1955 | Caldwell | |
| 2,727,881 A | 12/1955 | Caldwell et al. | |
| 2,822,348 A | 2/1958 | Haslam | |
| 3,671,487 A | 6/1972 | Abolins | |
| 3,907,868 A | 9/1975 | Currie et al. | |
| 3,953,394 A | 4/1976 | Fox et al. | |
| 4,128,526 A | 12/1978 | Borman | |
| 4,141,927 A | 2/1979 | White et al. | |
| 4,154,775 A | 5/1979 | Axelrod | |
| 4,180,494 A | 12/1979 | Fromuth et al. | |
| 4,254,011 A | 3/1981 | Bier | |
| 4,436,860 A * | 3/1984 | Hepp .......................... 524/394 | |
| 4,451,606 A * | 5/1984 | Campbell ..................... 524/445 | |
| 4,504,613 A | 3/1985 | Abolins et al. | |
| 4,506,043 A | 3/1985 | Ogawa et al. | |
| 4,609,680 A | 9/1986 | Fujita et al. | |
| 4,940,745 A | 7/1990 | Lausberg et al. | |
| 4,954,540 A | 9/1990 | Nakane et al. | |
| 5,115,016 A * | 5/1992 | Dickens et al. ............... 524/513 | |
| 5,162,424 A | 11/1992 | de Boer et al. | |
| 5,221,704 A | 6/1993 | Shimotsuma et al. | |
| 5,266,601 A | 11/1993 | Kyber et al. | |
| 5,326,806 A | 7/1994 | Yokoshima et al. | |
| 5,385,970 A | 1/1995 | Gallucci et al. | |
| 5,413,681 A | 5/1995 | Tustin et al. | |
| 5,451,611 A | 9/1995 | Chilukuri et al. | |
| 5,559,159 A | 9/1996 | Sublett et al. | |
| 5,684,071 A | 11/1997 | Mogami et al. | |
| 5,882,780 A | 3/1999 | Yamamura et al. | |
| 5,955,565 A | 9/1999 | Morris et al. | |
| 5,962,587 A | 10/1999 | Gaggar et al. | |
| 6,025,441 A | 2/2000 | Koshirai et al. | |
| 6,068,935 A | 5/2000 | Hayami et al. | |
| 6,111,031 A | 8/2000 | Puyenbroek et al. | |
| 6,150,473 A | 11/2000 | Brown et al. | |
| 6,162,837 A | 12/2000 | Gerking et al. | |
| 6,166,114 A | 12/2000 | Cosstick et al. | |
| 6,410,607 B1 | 6/2002 | Ekart et al. | |
| 6,420,459 B1 | 7/2002 | Horold | |
| 6,429,243 B1 | 8/2002 | Okamoto et al. | |
| 6,433,045 B1 | 8/2002 | Hanabusa et al. | |
| 6,503,988 B1 | 1/2003 | Kitahara et al. | |
| 6,515,044 B1 | 2/2003 | Idel et al. | |
| 6,518,322 B1 | 2/2003 | West | |
| 6,531,530 B2 | 3/2003 | Asano | |
| 6,538,054 B1 | 3/2003 | Klatt et al. | |
| 6,547,992 B1 | 4/2003 | Schlosser et al. | |
| 6,569,928 B1 | 5/2003 | Levchik et al. | |
| 6,642,288 B1 | 11/2003 | Hulskotte | |
| 6,794,463 B2 | 9/2004 | Aramaki et al. | |
| 6,887,909 B2 | 5/2005 | Kawamura et al. | |
| 6,927,275 B2 | 8/2005 | Hirokane et al. | |
| 7,105,589 B2 | 9/2006 | Geprags | |
| 7,169,836 B2 | 1/2007 | Harashina et al. | |
| 7,179,869 B2 | 2/2007 | Hirokane et al. | |
| 7,183,362 B2 | 2/2007 | Hirokane et al. | |
| 7,388,067 B2 * | 6/2008 | Leemans et al. .............. 528/301 | |

(Continued)

FOREIGN PATENT DOCUMENTS

DE 19904814 A1 8/2000

(Continued)

OTHER PUBLICATIONS

S.H. Mansour et al.,"Depolymerization of Poly(ethylene terephthalate) Waste Using 1, 4-Butanediol and Triethylene Glycol," Journal of Elastomers and Plastics; Apr. 2003, pp. 133-147, vol. 35, Sage Publications.
S. Sivaram et al., "Synthesis Characterization and Polycondensation of Bis-(4-Hydroxybutyl) Terephthalate," Polymer Bulletin 5, 1981, pp. 159-166, Springer-Verlag.
ASTM Designation: D 256-06, "Standard Test Methods for Determining the Izod Pendulum Impact Resistance of Plastics," pp. 1-20 (2006).
ASTM Designation: D 648-06, "Standard Test Method for Deflection Temperature of Plastics Under Flexural Load in the Edgewise Position," pp. 1-13 (2006).
"GE Gvies Plastic Bottle Recycling a New Spin"; ChemicalProcessing.com, Aug. 25, 2006 [online], accessed via the internet [retrieved on Oct. 16, 2009], URS: <http://www.chemicalprocessing.com/industrynews/2006/056.html>, 2 pages.

(Continued)

Primary Examiner — Tae H Yoon
(74) Attorney, Agent, or Firm — Cantor Colburn LLP; Diderico van Eyl

(57) ABSTRACT

A composition comprises, based on the total weight of the composition: from 20 to 90 wt. % of a polyester component comprising a modified poly(butylene terephthalate) copolymer that is derived from a poly(ethylene terephthalate) component; from 5 to 35 wt. % of a flame retardant phosphinate and/or a flame retardant diphosphinate; from 1 to 25 wt. % of a melamine polyphosphate, melamine cyanurate, melamine pyrophosphate, and/or melamine phosphate; from greater than zero to 50 wt. % of a glass fiber having a non-circular cross-section; and from 0 to 5 wt. % of an additive.

49 Claims, No Drawings

U.S. PATENT DOCUMENTS

| | | |
|---|---|---|
| 7,462,649 B2 | 12/2008 | Nakao et al. |
| 7,498,368 B2 | 3/2009 | Harashina et al. |
| 7,812,077 B2 * | 10/2010 | Borade et al. .................. 524/126 |
| 7,910,657 B2 * | 3/2011 | Cohoon-Brister ............ 525/190 |
| 2001/0007888 A1 | 7/2001 | Asano |
| 2001/0009944 A1 | 7/2001 | Chisholm et al. |
| 2002/0012807 A1 | 1/2002 | Kurian et al. |
| 2002/0096669 A1 | 7/2002 | Van Der Spek et al. |
| 2002/0123566 A1 | 9/2002 | Georgiev et al. |
| 2002/0134771 A1 | 9/2002 | Wenger et al. |
| 2003/0013788 A1 | 1/2003 | Mason et al. |
| 2003/0018107 A1 | 1/2003 | Heinen et al. |
| 2004/0192812 A1 | 9/2004 | Engelmann et al. |
| 2005/0137297 A1 * | 6/2005 | De Wit ......................... 524/100 |
| 2005/0137300 A1 | 6/2005 | Schlosser et al. |
| 2005/0143503 A1 | 6/2005 | Bauer et al. |
| 2005/0154099 A1 | 7/2005 | Kobayashi et al. |
| 2005/0272839 A1 | 12/2005 | Bauer et al. |
| 2006/0058431 A1 | 3/2006 | Cartier et al. |
| 2006/0084734 A1 | 4/2006 | Bauer et al. |
| 2006/0247339 A1 | 11/2006 | Harashina et al. |
| 2007/0049667 A1 | 3/2007 | Kim et al. |
| 2007/0161725 A1 | 7/2007 | Janssen |
| 2007/0244242 A1 | 10/2007 | Agarwal et al. |
| 2007/0275242 A1 | 11/2007 | Gopal et al. |
| 2008/0090950 A1 | 4/2008 | Costanzi et al. |
| 2008/0139711 A1 | 6/2008 | Borade et al. |
| 2008/0242789 A1 | 10/2008 | Zhu et al. |
| 2008/0269383 A1 | 10/2008 | Pauquet et al. |
| 2009/0124733 A1 | 5/2009 | Haruhara et al. |
| 2009/0203871 A1 | 8/2009 | Maruyama et al. |

FOREIGN PATENT DOCUMENTS

| | | |
|---|---|---|
| EP | 0146104 A2 | 6/1985 |
| EP | 0400935 A2 | 12/1990 |
| EP | 0672717 A1 | 9/1995 |
| EP | 0683201 A1 | 11/1995 |
| EP | 1967549 A1 | 12/2006 |
| GB | 1500577 | 2/1978 |
| JP | 4-345655 A | 12/1992 |
| JP | 2000-256472 A | 9/2000 |
| JP | 2005-89572 A | 4/2005 |
| KR | 20010083551 A | 9/2001 |
| WO | 9965987 A1 | 12/1999 |
| WO | 01/21698 A1 | 3/2001 |
| WO | 01/81470 A1 | 11/2001 |
| WO | 03/066704 A1 | 8/2003 |
| WO | 2005/059018 A1 | 6/2005 |
| WO | 2007/084538 A2 | 7/2007 |
| WO | 2007111774 A2 | 10/2007 |
| WO | 2008/011940 A1 | 1/2008 |
| WO | 2008/014254 A2 | 1/2008 |
| WO | 2008/014273 A1 | 1/2008 |

OTHER PUBLICATIONS

Pawlak, et al.; "Characterization of Scrap Poly(ethylene Terephthalate)"; European Polymer Journal, 36, p. 1875-1884; (2000).

International Search Report and Written Opinion; International Application No. PCT/US2009/069128; International Filing Date: Dec. 22, 2009; Date of mailing: Mar. 17, 2010; 16 pages.

International Preliminary Report on Patentability and Written Opinion; International Application No. PCT/US2009/069128; International Filing Date Dec. 22, 2009; Priority Date Dec. 30, 2008; Date of Mailing Jul. 14, 2001; Applicant's File Refernce P090125PCT; 9 pages.

* cited by examiner

REINFORCED POLYESTER COMPOSITIONS, METHOD OF MANUFACTURE, AND ARTICLES THEREOF

BACKGROUND

This disclosure relates to polyester compositions, method of manufacture, and articles thereof.

Thermoplastic polyester compositions, such as poly(alkylene terephthalates), have valuable characteristics including strength, toughness, high gloss, and solvent resistance. Polyesters therefore have utility as materials for a wide range of applications, from automotive parts to electric and electronic appliances. Because of their wide use, particularly in electronic applications, it is desirable to provide flame retardancy to polyesters.

Numerous flame retardants (FR) for polyesters are known, but many contain halogens, usually chlorine and/or bromine. Halogenated flame retardant agents are less desirable because of the increasing demand for ecologically friendly ingredients. Halogen-free flame retardants, such as phosphorus- and nitrogen-based compounds can be used as well. Unfortunately, they lack good flame retardancy in thin sections.

More ecologically compatible flame retardant (eco-FR) formulations based on aluminum salts of phosphinic or diphosphinic acid compounds and melamine compounds have been developed to overcome environmental issues of halogenated flame retardants. However, the formulations also possess undesirable mechanical properties, including reduced impact strength and tensile strength, as well as undesirable flow properties compared to the halogenated flame retardant compositions.

An ongoing need exists for polyester compositions, particularly from recycled polyester, having the combination of good flame retardant properties not only at thicknesses of 1.5 mm or greater, but also at thicknesses of 0.8 mm or less. It would be advantageous if this combination of flame retardant properties could be achieved while at least essentially maintaining mechanical properties and/or heat properties.

BRIEF SUMMARY OF THE INVENTION

A composition comprises based on the total weight of the composition: from 20 to 90 wt. % of a polyester component comprising a modified poly(butylene terephthalate) copolymer, that (1) is derived from a poly(ethylene terephthalate) component selected from the group consisting of poly(ethylene terephthalate) and poly(ethylene terephthalate) copolymers and (2) that has at least one residue derived from the poly(ethylene terephthalate) component; from 5 to 35 wt. % of a flame retardant phosphinate of the formula (I)

a flame retardant diphosphinate of the formula (II)

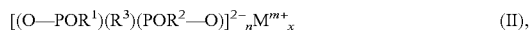

and/or a flame retardant polymer derived from the flame retardant phosphinate of the formula (I) or the flame retardant diphosphinate of the formula (II), wherein $R^1$ and $R^2$ are identical or different and are H, $C_1$-$C_6$ alkyl, linear or branched, or $C_6$-$C_{10}$ aryl; and $R^3$ is $C_1$-$C_{10}$ alkylene, linear or branched, $C_6$-$C_{10}$ arylene, $C_7$-$C_{11}$ alkylarylene, or $C_7$-$C_{11}$ arylalkylene; M is an alkaline earth metal, alkali metal, Al, Ti, Zn, Fe, or boron; m is 1, 2, 3 or 4; n is 1, 2, or 3; and x is 1 or 2; from 1 to 25 wt. % of a melamine polyphosphate, melamine cyanurate, melamine pyrophosphate, and/or melamine phosphate; from greater than zero to 50 wt. % of a glass fiber having a non-circular cross-section; and from 0 to 5 wt. % of an additive selected from the group consisting of a mold release agent, an antioxidant, a thermal stabilizer, an antioxidant, and a UV stabilizer; wherein the components and have a combined total weight of 100 wt. %.

Also disclosed is a method for the manufacture of the composition, comprising blending the components of the composition.

Further disclosed are articles comprising the composition.

Methods of forming an article comprise shaping by extruding, calendaring, or molding the composition to form the article.

DETAILED DESCRIPTION OF THE INVENTION

Our invention is based on the discovery that it is now possible to make a thermoplastic polyester composition that includes a modified poly(butylene terephthalate) copolymer that is made from post-consumer or post-industrial poly(ethylene terephthalate) (PET) and that has a combination of desirable flame retardance, thermal properties, and mechanical properties. Additionally, molded articles comprising the composition are less susceptible to warpage. The composition comprises a polyester component comprising a modified poly(butylene terephthalate) (PBT) derived from a post-consumer or post-industrial poly(ethylene terephthalate) (PET); a nitrogen-containing flame retardant selected from the group consisting of at least one of a triazine, a guanidine, a cyanurate, an isocyanurate, and mixtures thereof; a phosphinic acid salt and/or diphosphinic acid salt and/or their polymers as described below; and a flat glass reinforcing fiber having a non-circular cross-section. The use of a modified polyester component in combination with a specific amount of a metal phosphinate salt, a particular nitrogen-containing flame retardant (melamine polyphosphate, melamine cyanurate, melamine pyrophosphate, and/or melamine phosphate), and a flat glass fiber, provides compositions that have excellent flame retardancy for both thick and thin articles, in the absence of a halogenated organic flame retardant. The compositions can further have very useful mechanical properties, in particular impact strength, tensile properties, and/or heat stability. The compositions can optionally comprise a charring polymer, for example a polyetherimide, to further improve mechanical strength and flame retardance.

In a particularly advantageous feature, the polyester component comprises a modified poly(butylene terephthalate) component derived from poly(ethylene terephthalate) (PET), for example waste PET soft drink bottles. The modified PBT can also be referred to herein as PET-derived PBT, PBT-IQ, or IQ-PBT. Unlike conventional molding compositions containing virgin PBT (PBT that is derived from monomers), the modified PBT component contains a poly(ethylene terephthalate) residue, e.g., a material such as ethylene glycol and isophthalic acid groups (components that are not present in virgin, monomer-based PBT). Advantageously, despite using a PBT that is structurally different from virgin PBT, the compositions and articles made from the composition described herein exhibit similar performance properties as compositions and articles made from molding compositions containing monomer-based PBT. Use of modified PBT can provide a valuable way to effectively use underutilized scrap PET (from post-consumer or post-industrial streams) in PBT thermoplastic molding compositions, thereby conserving non-renewable resources and reducing the formation of greenhouse gases, e.g., $CO_2$. Surprisingly, molding compositions containing modified-PBT copolymers derived from poly(ethylene terephthalate) can exhibit improved flow properties, as compared to molding compositions containing PBT derived from monomers.

As used herein the singular forms "a," "an," and "the" include plural referents. The term "combination" is inclusive of blends, mixtures, alloys, reaction products, and the like. Unless defined otherwise, technical and scientific terms used herein have the same meaning as is commonly understood by one of skill. Compounds are described using standard nomenclature. The term "and a combination thereof" is inclusive of the named component and/or other components not specifically named that have essentially the same function.

Other than in the operating examples or where otherwise indicated, all numbers or expressions referring to quantities of ingredients, reaction conditions, and the like, used in the specification and claims are to be understood as modified in all instances by the term "about." Various numerical ranges are disclosed in this patent application. Because these ranges are continuous, they include every value between the minimum and maximum values. The endpoints of all ranges reciting the same characteristic or component are independently combinable and inclusive of the recited endpoint. Unless expressly indicated otherwise, the various numerical ranges specified in this application are approximations. The term "from more than 0 to" an amount means that the named component is present in some amount more than 0, and up to and including the higher named amount.

All ASTM tests and data are from the 2003 edition of the Annual Book of ASTM Standards unless otherwise indicated. All cited references are incorporated herein by reference.

For the sake of clarity, the terms terephthalic acid group, isophthalic acid group, butanediol group, ethylene glycol group in formulas have the following meanings. The term "terephthalic acid group" in a composition refers to a divalent 1,4-benzene radical (-1,4-($C_6H_4$)—) remaining after removal of the carboxylic groups from terephthalic acid-. The term "isophthalic acid group" refers to a divalent 1,3-benzene radical (-(-1,3-$C_6H_4$)—) remaining after removal of the carboxylic groups from isophthalic acid. The "butanediol group" refers to a divalent butylene radical (—($C_4H_8$)—) remaining after removal of hydroxyl groups from butanediol. The term "ethylene glycol group" refers to a divalent ethylene radical (—($C_2H_4$)—) remaining after removal of hydroxyl groups from ethylene glycol. With respect to the terms "terephthalic acid group," "isophthalic acid group," "ethylene glycol group," "butane diol group," and "diethylene glycol group" being used in other contexts, e.g., to indicate the weight % of the group in a composition, the term "isophthalic acid group(s)" means the group having the formula (—O(CO)$C_6H_4$(CO)—), the term "terephthalic acid group" means the group having the formula (—O(CO)$C_6H_4$(CO)—), the term diethylene glycol group means the group having the formula (—O($C_2H_4$)O($C_2H_4$)—), the term "butanediol group" means the group having the formula (—O($C_4H_8$)—), and the term "ethylene glycol groups" means the group having formula (—O($C_2H_4$)—).

The residue derived from the poly(ethylene terephthalate) component, which is present in the modified poly(butylene terephthalate) component can be selected from the group consisting of ethylene glycol groups, diethylene glycol groups, isophthalic acid groups, antimony-containing compounds, germanium-containing compounds, titanium-containing compounds, cobalt-containing compounds, tin-containing compounds, aluminum, aluminum salts, 1,3-cyclohexane dimethanol isomers, 1,4-cyclohexane dimethanol isomers, the cis isomer of 1,3-cyclohexane dimethanol, the cis isomer of 1,4-cyclohexane dimethanol, the trans isomer of 1,3-cyclohexane dimethanol, the trans isomer of 1,4-cyclohexane dimethanol, alkali salts, alkaline earth metal salts, including calcium, magnesium, sodium and potassium salts, phosphorous-containing compounds and anions, sulfur-containing compounds and anions, naphthalene dicarboxylic acids, 1,3-propanediol groups, and combinations thereof.

Depending on factors such as poly(ethylene terephthalate) and poly(ethylene terephthalate) copolymers, the residue can include various combinations. For example, the residue can include mixtures of ethylene glycol groups and diethylene glycol groups. The residue can also include mixtures of ethylene glycol groups, diethylene glycol groups, and isophthalic acid groups. The residue derived from poly(ethylene terephthalate) can include the cis isomer of 1,3-cyclohexane dimethanol groups, the cis isomer of 1,4-cyclohexane dimethanol groups, the trans isomer of 1,3-cyclohexane dimethanol groups, the trans isomer of 1,4-cyclohexane dimethanol groups, or combinations thereof. The residue can also be a mixture of ethylene glycol groups, diethylene glycol groups, isophthalic acid groups, cis isomer of cyclohexane dimethanol groups, trans isomer of cyclohexane dimethanol groups, or combinations thereof. The residue derived from poly(ethylene terephthalate) can also include mixtures of ethylene glycol groups, diethylene glycol groups, and cobalt-containing compounds. Such cobalt-containing compound mixture can also contain isophthalic acid groups.

The amount of the ethylene glycol groups, diethylene glycol groups, and isophthalic groups in the polymeric backbone of the modified PBT component can vary. The PET-derived modified PBT component ordinarily contains isophthalic acid groups in an amount that is at least 0.1 mole % and can range from 0 or 0.1 to 10 mole % (0 or 0.07 to 7 wt. %). The PET-derived modified PBT component ordinarily contains ethylene glycol in an amount that is at least 0.1 mole % and can range from 0.1 to 10 mole % (0.02 to 2 wt. %). In one embodiment, the PET-derived modified PBT component has an ethylene glycol content that is more than 0.85 wt. %. In another embodiment, compositions can contain ethylene glycol in an amount from 0.1 wt. % to 2 wt. %. The modified PBT component can also contain diethylene glycol in an amount from 0.1 to 10 mole % (0.04 to 4 wt. %). The amount of the butanediol groups is generally about 98 mole % and can vary from 95 to 99.8 mole % in some embodiments. The amount of the terephthalic acid groups is generally about 98 mole % and can vary from 90 to 99.9 mole % in some embodiments.

Unless otherwise specified, all molar amounts of the isophthalic acid groups and/or terephthalic acid groups are based on the total moles of diacids/diesters in the composition. Unless otherwise specified, all molar amounts of the butanediol, ethylene glycol, and diethylene glycol groups are based on the total moles of diol in the composition. The weight percent measurements stated above are based on the way terephthalic acid groups, isophthalic acid groups, ethylene glycol groups, and diethylene glycol groups have been defined herein.

The total amount of the poly(ethylene terephthalate) component residue in the modified poly(butylene terephthalate) copolymer can vary in amounts from 1.8 to 2.5 wt. %, or from 0.5 to 2 wt. %, or from 1 to 4 wt. %, based on the total weight of the modified poly(butylene terephthalate) copolymer. The ethylene glycol, diethylene glycol, and cyclohexane dimethanol groups can be present, individually or in combination, in an amount from 0.1 to 10 mole %, based on 100 mole % of glycol in the molding composition. The isophthalic acid groups can be present in an amount from 0.1 to 10 mole %, based on 100 mole % of diacid/diester in the molding composition.

It has been discovered that when it is desirable to make a poly(butylene terephthalate) copolymer having a melting temperature Tm that is at least 200° C., the total amount of diethylene glycol, ethylene glycol, and isophthalic acid groups should be within a certain range. As such, the total amount of the diethylene glycol, ethylene glycol, and isophthalic acid groups in the modified poly(butylene terephthalate) component can be more than 0 and less than or equal to 23 equivalents, relative to the total of 100 equivalents of diol and 100 equivalents of diacid groups in the modified poly(butylene terephthalate) copolymer. The total amount of the isophthalic acid groups, ethylene glycol groups, and diethylene glycol groups can be from 3 to less than or equal to 23 equivalents, relative to the total of 100 equivalents of diol and 100 equivalents of diacid groups in the modified poly(butylene terephthalate) copolymer. Alternatively, the total amount of the isophthalic acid groups, ethylene glycol groups, and diethylene glycol groups can be from 3 to less than or equal to 10 equivalents, relative to the total of 100 equivalents of diol and 100 equivalents of diacid groups in the modified poly(butylene terephthalate) copolymer. Still further, the total amount of the isophthalic acid groups, ethylene glycol groups, and diethylene glycol groups can be from 10 to less than or equal to 23 equivalents, relative to the total of 100 equivalents of diol and 100 equivalents of diacid groups in the modified poly(butylene terephthalate) copolymer. The diethylene glycol, ethylene glycol, and/or isophthalic acid can be added during the process.

The total ethylene glycol groups, isophthalic acid groups, and diethylene glycol groups can vary, depending on the application needs. The composition can have total monomer content selected from the group consisting of ethylene glycol, isophthalic acid groups, and diethylene glycol groups in an amount from more than 0 and less than or equal to 17 equivalents relative to the total of 100 equivalents of diol and 100 equivalents of diacid groups in the modified poly(butylene terephthalate) copolymer. Advantageously, such compositions can maintain useful properties, such as heat deflection temperatures that are more than 80° C.

It has also been discovered that the total amount of inorganic residues derived from the poly(ethylene terephthalate) can be present from more than 0 ppm and up to 1000 ppm. Examples of such inorganic residues include those selected from the group consisting of antimony-containing compounds, germanium-containing compounds, titanium-containing compounds, cobalt-containing compounds, tin containing compounds, aluminum, aluminum salts, alkaline earth metal salts, alkali salts, including calcium, magnesium, sodium and potassium salts, phosphorous-containing compounds and anions, sulfur-containing compounds and anions, and combinations thereof. The amounts of inorganic residues can be from 250 to 1000 ppm, and more specifically from 500 to 1000 ppm.

The PET component from which the modified poly(butylene terephthalate) copolymer is made can have a variety of forms. Generally, the PET component includes recycle (scrap) PET in flake, powder/chip, film, or pellet form. Before use, the PET is generally processed to remove impurities such as paper, adhesives, polyolefin, e.g., polypropylene, polyvinyl chloride (PVC), nylon, polylactic acid, and other contaminants. Also, the PET component can include PET that is not waste in flake, chip, or pellet form. As such, PET that would ordinarily be deposited in landfills can now be used productively and effectively. The PET component can also include other polyesters and/or polyester copolymers. Examples of such materials include poly(alkylene terephthalates) selected from the group consisting of poly(ethylene terephthalate), poly(cyclohexane dimethanol terephthalate), copolyesters of terephthalate esters with comonomers containing cyclohexanedimethanol and ethylene glycol, copolyesters of terephthalic acid with comonomers containing cyclohexane dimethanol and ethylene glycol, poly(butylene terephthalate), poly(xylylene terephthalate), poly(butylene terephthalate), poly(trimethylene terephthalate), polyester naphthalates, and combinations thereof.

The modified poly(butylene terephthalate) component derived from poly(ethylene terephthalate) is (1) is derived from a poly(ethylene terephthalate) component selected from the group consisting of poly(ethylene terephthalate) and poly(ethylene terephthalate) copolymers and (2) has at least one residue derived from the poly(ethylene terephthalate) component. In one embodiment, the modified poly(butylene terephthalate) component can further be derived from a biomass-derived 1,4-butanediol, e.g. corn derived 1,4-butanediol or a 1,4-butanediol derived from a cellulosic material.

The modified poly(butylene terephthalate) copolymer can be derived from the poly(ethylene terephthalate) component by any method that involves depolymerization of the poly(ethylene terephthalate) component and polymerization of the depolymerized poly(ethylene terephthalate) component with 1,4-butanediol to provide the modified poly(butylene terephthalate) copolymer. For example, the modified poly(butylene terephthalate) component can be made by a process that involves depolymerizing a poly(ethylene terephthalate) component selected from the group consisting of poly(ethylene terephthalate) and poly(ethylene terephthalate) copolymers, with a 1,4-butanediol component at a temperature from 180° C. to 230° C., under agitation, at a pressure that is at least atmospheric pressure in the presence of a catalyst component, at an elevated temperature, under an inert atmosphere, to produce a molten mixture containing a component selected from the group consisting of oligomers containing ethylene terephthalate moieties, oligomers containing ethylene isophthalate moieties, oligomers containing diethylene terephthalate moieties, oligomers containing diethylene isophthalate moieties, oligomers containing butylene terephthalate moieties, oligomers containing butylene isophthalate moieties, covalently bonded oligomeric moieties containing at least two of the foregoing moieties, 1,4-butanediol, ethylene glycol, and combinations thereof; and agitating the molten mixture at sub-atmospheric pressure and increasing the temperature of the molten mixture to an elevated temperature under conditions sufficient to form a modified poly(butylene terephthalate) copolymer containing at least one residue derived from the poly(ethylene terephthalate) component.

Polyester moieties and the 1,4-butanediol are combined in the liquid phase under agitation and the 1,4-butanediol can be continuously refluxed back into the reactor during step (a). The tetrahydrofuran (THF) and water formed in the stage can be removed by distillation or partial condensation.

The poly(ethylene terephthalate) component and the 1,4-butanediol component are generally combined under atmospheric pressure. In another embodiment, however, it is possible to use pressures that are higher than atmospheric pressures. For instance, in one embodiment, the pressure at which the poly(ethylene terephthalate) component and the 1,4-butanediol are subjected to is 2 atmospheres or higher. For higher pressures, the reaction mixtures can be depolymerized at temperatures higher than 230° C.

The temperature at which the poly(ethylene terephthalate) component and the 1,4-butanediol component are combined and reacted is sufficient to promote depolymerization of the poly(ethylene terephthalate) component into a mixture of oligomers containing ethylene terephthalate moieties, oligomers containing ethylene isophthalate moieties, oligomers containing diethylene terephthalate moieties, oligomers containing diethylene isophthalate moieties, oligomers containing butylene terephthalate moieties, oligomers containing butylene isophthalate moieties, covalently bonded oligomeric moieties containing at least two of the foregoing moieties, 1,4-butanediol, ethylene glycol, and combinations thereof. The temperature at which the poly(ethylene terephthalate) component and the 1,4-butanediol component are combined generally ranges from 180 to 230° C. 1,4-Butanediol is generally used in excess amount relative to the poly (ethylene terephthalate) component. In one embodiment, 1,4-butanediol is used in a molar excess amount from 2 to 20.

During the initial stage of the process when the poly(ethylene terephthalate) component and the 1,4-butanediol are combined and react ("step (a)"), the poly(ethylene terephthalate) component and the 1,4-butanediol depolymerize into a molten mixture at a pressure that is at least atmospheric pressure suitable conditions. 1,4-Butanediol and ethylene glycol are generally recirculated, and tetrahydrofuran is distilled during "step (a)" of the process. The molten mixture contains oligomers containing ethylene terephthalate moieties, oligomers containing ethylene isophthalate moieties, oligomers containing diethylene terephthalate moieties, oligomers containing diethylene isophthalate moieties, oligomers containing butylene terephthalate moieties, oligomers containing butylene isophthalate moieties, covalently bonded oligomeric moieties containing at least two of the foregoing moieties, 1,4-butanediol, ethylene glycol, and combinations thereof.

The duration of the step in which poly(ethylene terephthalate) component reacts with 1,4-butanediol can vary, depending on factors, such as available equipment, production needs, desired final properties, and the like. In one embodiment, this step is carried out in at least 2 hours. In another embodiment, the step is carried out from 2 to 5 hours.

The process further includes the step of subjecting the molten mixture to sub-atmospheric pressure and increasing the temperature of the molten mixture to a temperature from 240 to 260° C., and thereby forming the modified poly(butylene terephthalate) component derived from the poly(ethylene terephthalate) component.

Excess butanediol, ethylene glycol, and THF are preferably removed and step (b) is carried out under agitation. The molten mixture, when placed in sub-atmospheric pressure conditions at a suitable temperature for a sufficiently long time period, polymerizes into a modified poly(butylene terephthalate) component derived from the poly(ethylene terephthalate) component copolymer. Generally, the molten mixture pressure is subjected to a pressure from sub-atmospheric to less than 1 Torr (0.133 MPa). In one embodiment, the pressure is reduced to a pressure from 100 to 0.05 Torr (13.3 to 0.0066 MPa) in a continuous manner. In another embodiment, the pressure is reduced to a pressure from 10 to 0.1 Torr (1.33 to 0.0133 MPa) in a continuous fashion. Advantageously, the molten mixture can be placed under sub-atmospheric conditions without isolation and dissolution of any material from the molten mixture. The avoidance of this step greatly enhances the utility of the process.

During the step when the molten mixture is placed under sub-atmospheric conditions and the temperature is increased, excess butanediol, ethylene glycol, and THF are removed from the reactor and oligomers are allowed to build in molecular weight. Agitation can be continuously provided to facilitate the removal of the low boiling components and allow the molecular weight buildup of the polymer. After sufficient molecular weight is obtained, the resulting molten PBT polymer is cast from the reactor through a diehead, cooled with water, stranded and chopped into pellets.

The duration of the step (step (b) discussed above) in which the molten mixture polymerizes from poly(ethylene terephthalate) and poly(butylene terephthalate) oligomers, 1,4-butanediol, and ethylene glycol can vary, depending on factors, such as equipment available, production needs, desired final properties, and the like. In one embodiment, this step is carried out in at least two hours. In another embodiment, the step is carried out from 2 to 5 hours.

The temperature at which the molten mixture is placed under sub-atmospheric conditions is sufficiently high to promote polymerization of the poly(ethylene terephthalate) and poly(butylene terephthalate) oligomers, 1,4-butanediol, and ethylene glycol to the modified poly(butylene terephthalate) component derived from the poly(ethylene terephthalate) component. Generally, the temperature is at least 230° C. In one embodiment, the temperature is from 250° C. to 275° C.

Both steps of the process can be carried out in the same reactor. In one embodiment, however, the process is carried out in two separate reactors, where step (a) is carried out in a first reactor and when the molten mixture has formed, the molten mixture is placed in a second reactor and step (b) is carried out. In another embodiment, the process can be carried out in more than two reactors. In another embodiment, the process can be carried out in a continuous series of reactors.

The catalyst component that facilitates the reaction can be selected from antimony compounds, tin compounds, titanium compounds, combinations thereof as well as many other metal catalysts and combinations of metal catalysts that have been disclosed in the literature. The amount of the catalyst will vary depending on the specific need at hand. Suitable amounts of the catalyst range from 1 to 5000 ppm, or more. The catalyst component is generally added during the step when the poly(ethylene terephthalate) component initially combines with the 1,4-butanediol component. In another embodiment, however, the catalyst component can be added to the molten mixture that forms after the poly(ethylene terephthalate) component and the 1,4-butanediol component are combined.

The process for making the modified poly(butylene terephthalate) copolymer is preferably carried out under agitative conditions. The term "agitative conditions" or "agitation" refers to subjecting the poly(ethylene terephthalate) component and the 1,4-butanediol or the molten mixture to conditions that involve physically mixing the poly(ethylene terephthalate) component 1,4-butanediol or molten mixture under conditions that promote the depolymerization of the PET when the agitative conditions are applied to poly(ethylene terephthalate) component 1,4-butanediol, i.e., step (a), or the polymerization of the PBT from poly(ethylene terephthalate) oligomers, 1,4-butanediol, and ethylene glycol, i.e., step (b). The physical mixing can be accomplished by any suitable way. In one embodiment, a mixer containing rotating shaft and blades that are perpendicular to the shaft can be used.

The process for making the modified poly(butylene terephthalate) copolymer can include a step that reduces the amount of THF produced during the process by adding a basic compound containing an alkali metal to the reactor in step (a) and thereby reducing formation of THF. The basic compound contains an alkali metal and can be, for example, sodium alkoxides, sodium hydroxide, sodium acetate, sodium carbonate, sodium bicarbonates, potassium alkoxides, potassium hydroxide, potassium acetate, potassium carbonate, potassium bicarbonate, lithium alkoxides, lithium hydroxide, lithium acetate, lithium carbonate, lithium bicarbonate, calcium alkoxides, calcium hydroxide, calcium acetate, calcium carbonate, calcium bicarbonates, magnesium alkoxides, magnesium hydroxide, magnesium acetate, magnesium carbonate, magnesium bicarbonates, aluminum alkoxides, aluminum hydroxide, aluminum acetate, aluminum carbonate, aluminum bicarbonates, and combinations thereof. The amount of the basic compound added to a mixture is generally at least 0.1 ppm. In one embodiment, the amount of the basic compound is from 0.1 to 50 ppm. In another embodiment, the amount of the basic compound ranges from 1 to 10 ppm.

In another embodiment, a difunctional epoxy compound can be added to reduce the formation of THF. The epoxy compounds can be selected from the group of difunctional epoxies. Examples of suitable difunctional epoxy compounds include and are not limited to 3,4-epoxycyclohexyl-3,4-epoxycyclohexyl carboxylate, bis(3,4-epoxycyclohexylmethyl)adipate, vinylcyclohexene di-epoxide, bisphenol diglycidyl ethers such as bisphenol-A diglycidyl ether, tetrabromobisphenol-A diglycidyl ether, glycidol, diglycidyl adducts of amines and amides, diglycidyl adducts of carboxylic acids such as the diglycidyl ester of phthalic acid the diglycidyl ester of hexahydrophthalic acid, and bis(3,4-epoxy-6-methylcyclohexylmethyl) adipate, butadiene diepoxide, vinylcyclohexene diepoxide, dicyclopentadiene diepoxide, and the like. Especially preferred is 3,4-epoxycyclohexyl-3,4-epoxycyclohexylcarboxylate. The amount of the epoxy added to the mixture is generally at least 0.05 wt. %. In one embodiment, the amount of the epoxy compound is from 0.1 to 1 wt. %. In another embodiment, the amount of the epoxy compound was 0.2 to 0.5 wt. %.

In another embodiment, THF production is reduced by a process that involves the steps of: (a) reacting (i) a poly(ethylene terephthalate) component selected from the group consisting of poly(ethylene terephthalate) and poly(ethylene terephthalate) copolymers with a diol component selected from the group consisting of ethylene glycol, propylene glycol, and combinations thereof, in a reactor at a pressure that is at least atmospheric pressure in the presence of a catalyst component at a temperature from 190° C. to 250° C., under an inert atmosphere, under conditions sufficient to depolymerize the poly(ethylene terephthalate) component into a first molten mixture containing components selected from the group consisting of oligomers containing ethylene terephthalate moieties, oligomers containing ethylene isophthalate moieties, oligomers containing diethylene terephthalate moieties, oligomers containing diethylene isophthalate moieties, oligomers containing trimethylene terephthalate moieties, oligomers containing trimethylene isophthalate moieties, covalently bonded oligomeric moieties containing at least two of the foregoing moieties, ethylene glycol, propylene glycol and combinations thereof; wherein the poly(ethylene terephthalate) component and the diol component are combined under agitation; (b) adding 1,4-butanediol to the first molten mixture in a reactor in the presence of a catalyst component at a temperature from 190 to 240° C., under conditions that are sufficient to form a second molten mixture containing a component selected from the group consisting of oligomers containing ethylene terephthalate moieties, oligomers containing ethylene isophthalate moieties, oligomers containing diethylene terephthalate moieties, oligomers containing diethylene isophthalate moieties, oligomers containing trimethylene terephthalate moieties, oligomers containing trimethylene isophthalate moieties, oligomers containing butylene terephthalate moieties, oligomers containing butylene isophthalate moieties, covalently bonded oligomeric moieties containing at least two of the foregoing moieties, 1,4-butanediol, propylene glycol, ethylene glycol, and combinations thereof; and (c) increasing the temperature of the second molten mixture under sub-atmospheric conditions and agitation to a temperature from 240 to 260° C., thereby forming a modified poly(butylene terephthalate) copolymer containing at least one residue derived from the poly(ethylene terephthalate) component.

This three-step embodiment provides an additional advantageous way for producing modified PBT copolymers from PET. The diol component used in step (a) of the three-step embodiment can be selected from ethylene glycol, propylene glycol, and combinations thereof. The diol component can be present in step (a) at a molar amount that is at least half the amount of the ethylene glycol moieties present in the poly(ethylene terephthalate) component. The depolymerization of the poly(ethylene terephthalate) component can be carried out for various times. In one embodiment, the depolymerization is carried out for at least 25 minutes. The 1,4-butanediol used during step (b) of the three step embodiment can be added at a molar amount that is in excess relative to the molar amount of butanediol moieties incorporated into the modified poly(butylene terephthalate) copolymer component obtained in step (c). During the process the compounds used in the process can be reused and/or collected. In one embodiment, the diol component selected from the group consisting of ethylene glycol, propylene glycol, and combinations thereof and (2) 1,4-butanediol are removed and collected in a vessel in step (b). In another embodiment, in step (b), 1,4-butanediol is refluxed back into the reactor and a component selected from the group of excess butanediol, ethylene glycol, propylene glycol, tetrahydrofuran, and combinations thereof is removed. Step (b) is practiced for a sufficient period of time to reduce at least 65% of ethylene glycol from the second molten mixture. The duration of step (b) can also vary. In one embodiment, step (b) lasts at least 45 minutes. The pressure at which step (b) is carried out can vary. In one embodiment, step (b) is carried out in atmospheric conditions. In another embodiment, step (b) is carried out in sub-atmospheric conditions. Different combinations are possible. In one embodiment, step (b) is carried out with excess 1,4-butanediol and at a pressure from 300 to 1500 mbar absolute (30 to 150 MPa). In another embodiment, 1,4-butanediol is used in a molar excess amount from 1.1 to 5. Step (c) of the three-step embodiment can also be carried out with modifications, depending on the application. In one embodiment, for example, a component selected from the group of excess butanediol, ethylene glycol, propylene glycol, tetrahydrofuran, and combinations thereof is removed during step (c). The pressure at which step (c) is carried out can also vary. In one embodiment, step (c) is carried out at a pressure that is less than 10 mbar (1 MPa). The three-step process can be carried out in the same reactor. Alternatively, the three-step process can be carried out in at least two reactors.

In another embodiment, the three-step process can include the step of adding a basic compound during step (a), step (b), step (c), and combinations thereof, and thereby further reduce THF production. The basic compound, as in the two-step embodiment, can contain those compounds mentioned above. Alternatively, difunctional epoxy compounds can be added during step (b) in the amounts indicated above.

The process for making the modified PBT copolymer can contain an additional step in which the PBT formed from the molten mixture is subjected to solid-state polymerization. Solid-state polymerization generally involves subjecting the PBT formed from the molten mixture to an inert atmosphere or sub-atmospheric pressure and heating to a temperature for a sufficient period of time to build the molecular weight of the PBT. Generally, the temperature to which the PBT is heated is below the melting temperature of the PBT, e.g., from 5° C. to 60° C. below the melting temperature of the PBT. In one embodiment, such a temperature can range from 150° C. to 210° C. Suitable periods of time during which the solid-state polymerization occurs can range from 2 to 20 hours, depending on the conditions and equipment. The solid-state polymerization is generally carried out under tumultuous conditions sufficient to promote further polymerization of the PBT to a suitable molecular weight. Such tumultuous conditions can be created by subjecting the PBT to tumbling, the pumping of inert gas into the system to promote fluidization of polymer particle, e.g., pellets, chips, flakes, powder, and the like. The solid-state polymerization can be carried out at atmospheric pressure and/or under reduced pressure, e.g. from 1 atmosphere to 1 mbar (101 to 0.1 MPa).

In still another embodiment, the 1,4-butanediol used to make the modified poly(butylene terephthalate) copolymer can be derived from biomass. The term "biomass" means living or dead biological matter that can be directly or subsequently converted to useful chemical substances that are ordinarily derived from non-renewable hydrocarbon sources. Biomass can include cellulosic materials, grains, starches derived from grains, fatty acids, plant based oils, as well as derivatives from these biomass examples. Examples of useful chemical substances include and are not limited to diols; diacids; monomers used to make diols or acids, e.g., succinic acid; monomers used to make polymers; and the like. Biomass based butanediol can be obtained from several sources. For instance, the following process can be used to obtain biomass-based 1,4-butanediol. Agriculture based biomass, such as corn, can be converted into succinic acid by a fermentation process that also consumes carbon dioxide. Such succinic acid is commercially available from several sources such as from Diversified Natural Products Inc. under the trade name "BioAmber™." This succinic acid can be easily converted into 1,4-butanediol by processes described in several published documents such as in U.S. Pat. No. 4,096,156, incorporated herein in its entirety. Bio-mass derived-1,4-butanediol can also be converted to tetrahydrofuran, and further converted to polytetrahydrofuran, also known as poly(butylene oxide glycol). Smith et al. describe another process that describes converting succinic acid into 1,4-butanediol in Life Cycles Engineering Guidelines, as described in EPA publication EPA/600/R-1/101 (2001). When this embodiment is used, the manufacture of compositions containing the modified poly(butylene terephthalate) can further reduce $CO_2$ emissions that are ordinary generated when PBT is made from fossil fuel derived monomers. Also, this further reduces the amount of non-renewable hydrocarbon sources that are used in order to make the PBT.

The amount of the modified PBT copolymer in the compositions varies with the specific application. Generally, the modified PBT copolymer functions as the polyester component of the composition. The polyester component can accordingly comprise more than 0, up to 100 wt. % of the modified PBT copolymer, specifically from 1 to 99 wt. %, more specifically from to 5 to 90 wt. %, even more specifically from 10 to 80 wt. %, still more specifically from 20 to 70 wt. %, or from 30 to 60 wt. % Each of the foregoing is based on the total weight of the polyester component.

The modified PBT copolymer can be combined with a second polyester and/or polyester copolymer, for example virgin polyesters (polyesters derived from monomers rather than recycled polymer, including virgin poly(1,4-butylene terephthalate). More particularly, the second polyester can be obtained by copolymerizing a glycol component and a dicarboxylic acid component comprising at least 70 mole %, more specifically at least 80 mole %, of terephthalic acid, or polyester-forming derivatives thereof. The glycol component, more specifically tetramethylene glycol, can contain up to 30 mole %, more specifically up to 20 mole % of another glycol, such as ethylene glycol, trimethylene glycol, 2-methyl-1,3-propane glycol, hexamethylene glycol, decamethylene glycol, cyclohexane dimethanol, neopentylene glycol, resorcinol, hydroquinone, and the like, and mixtures comprising at least one of the foregoing glycols. The acid component can contain up to 30 mole %, more specifically up to 20 mole %, of another acid such as isophthalic acid, 2,6-naphthalene dicarboxylic acid, 2,7-naphthalene dicarboxylic acid, 1,5-naphthalene dicarboxylic acid, 4,4'-diphenyl dicarboxylic acid, 4,4'-diphenoxyethanedicarboxylic acid, sebacic acid, adipic acid, 4,4'-dicarboxydiphenyl ether, 1,2-di(p-carboxyphenyl)ethane, and the like, and polyester-forming derivatives thereof, and mixtures comprising at least one of the foregoing acids or acid derivatives. Most specifically, the dicarboxylic acid is selected from the group consisting of terephthalic acid, isophthalic acid, naphthalene dicarboxylic acids, and the like, and mixtures comprising at least one of the foregoing dicarboxylic acids.

Also contemplated herein are second polyesters comprising minor amounts, e.g., 0.5 to 30 percent by weight, of units derived from aliphatic acids and/or aliphatic polyols to form copolyesters. The aliphatic polyols include glycols, such as poly(ethylene glycol). Such polyesters can be made following the teachings of, for example, U.S. Pat. No. 2,465,319 to Whinfield et al., and U.S. Pat. No. 3,047,539 to Pengilly.

Second polyesters comprising block copolyester resin components are also contemplated, and can be prepared by the transesterification of (a) straight or branched chain poly (alkylene terephthalate) and (b) a copolyester of a linear aliphatic dicarboxylic acid and, optionally, an aromatic dibasic acid such as terephthalic or isophthalic acid with one or more straight or branched chain dihydric aliphatic glycols. Especially useful when high melt strength is important are branched high melt viscosity resins, which include a small amount of, e.g., up to 5 mole percent based on the acid units of a branching component containing at least three ester forming groups. The branching component can be one that provides branching in the acid unit portion of the polyester, in the glycol unit portion, or it can be a hybrid branching agent that includes both acid and alcohol functionality. Illustrative of such branching components are tricarboxylic acids, such as trimesic acid, and lower alkyl esters thereof, and the like; tetracarboxylic acids, such as pyromellitic acid, and lower alkyl esters thereof, and the like; or preferably, polyols, and especially preferably, tetrols, such as pentaerythritol; triols, such as trimethylolpropane; dihydroxy carboxylic acids; and hydroxydicarboxylic acids and derivatives, such as dimethyl hydroxyterephthalate, and the like. Branched poly(alkylene terephthalate) resins and their preparation are described, for example, in U.S. Pat. No. 3,953,404 to Borman. In addition to terephthalic acid units, small amounts, e.g., from 0.5 to 15 mole percent of other aromatic dicarboxylic acids, such as isophthalic acid or naphthalene dicarboxylic acid, or aliphatic dicarboxylic acids, such as adipic acid, can also be present, as well as a minor amount of diol component other than that derived from 1,4-butanediol, such as ethylene glycol or cyclohexane dimethanol, etc., as well as minor amounts of trifunctional, or higher, branching components, e.g., pentaerythritol, trimethyl trimesate, and the like.

More specific second polyesters include those selected from the group consisting of poly(ethylene terephthalate), poly(1,4-butylene terephthalate), poly(ethylene naphthalate), poly(1,4-butylene naphthalate), poly(trimethylene terephthalate), poly(1,4-cyclohexanenedimethylene 1,4-cyclohexanedicarboxylate), poly(1,4-cyclohexanedimethylene terephthalate), poly(1,4-butylene-co-1,4-but-2-ene diol terephthalate), poly(cyclohexanedimethylene-co-ethylene terephthalate), and a combination thereof. Most specifically, the second polyester is virgin poly(1,4-butylene terephthalate).

However, in a specific embodiment, the polyester component of the thermoplastic composition consists essentially of the modified poly(1,4-butylene terephthalate), such that the presence of any other polymer resins (e.g., a second polyester, a polycarbonate, or a polycarbonate-polyester) do not significantly adversely affect the basis and novel properties of the composition. A polymer species such as an impact modifier or anti-drip agent, can accordingly be present. In another embodiment, the polyester component contains only the modified poly(1,4-butylene terephthalate), such that the thermoplastic compositions have no other polyester, polycarbonate, or polycarbonate-ester, other than the modified poly(1,4-butylene terephthalate). Again, a polymer species such as an impact modifier or anti-drip agent, can be present, because these species are not part of the polyester component as defined herein.

Any of the foregoing first and optional second polyesters can have an intrinsic viscosity of 0.4 to 2.0 deciliters per gram (dL/g), measured in a 60:40 by weight phenol/1,1,2,2-tetrachloroethane mixture at 23° C. The PBT can have a weight average molecular weight of 10,000 to 200,000 Daltons, specifically 50,000 to 150,000 Daltons as measured by gel permeation chromatography (GPC). The polyester component can also comprise a mixture of different batches of PBT prepared under different process conditions in order to achieve different intrinsic viscosities and/or weight average molecular weights.

The polyester component comprising the modified PBT can be present in the composition in an amount from 20 to 90 weight percent, based on the total weight of the composition. Within this range, it is preferred to use at least 25 weight percent, even more preferably at least 30 weight percent of the polyester component. In one embodiment, the polyester component is present in an amount of 20 to 80 weight percent, based on the total weight of the composition, specifically 35 to 75 weight percent, even more specifically 40 to 75 weight percent, each based on the total weight of the composition.

The composition includes a flame retarding quantity of one or a mixture of nitrogen-containing flame retardants such as triazines, guanidines, cyanurates, and isocyanurates. Preferred triazines have the formula:

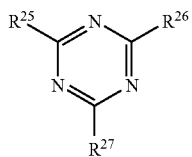

wherein $R^{25}$, $R^{26}$, and $R^{27}$ are independently $C_1$-$C_{12}$ alkyl, $C_1$-$C_{12}$ alkoxy, $C_6$-$C_{12}$ aryl, amino, $C_1$-$C_{12}$ alkyl-substituted amino, or hydrogen. Highly preferred triazines include 2,4,6-triamine-1,3,5-triazine (melamine, CAS Reg. No. 108-78-1), melamine derivatives, melam, melem, melon, ammeline (CAS Reg. No. 645-92-1), ammelide (CAS Reg. No. 645-93-2), 2-ureidomelamine, acetoguanamine (CAS Reg. No. 542-02-9), benzoguanamine (CAS Reg. No. 91-76-9), and the like. Salts/adducts of these compounds with boric acid or phosphoric acid can be used in the composition. Examples include melamine pyrophosphate and melamine polyphosphate. Preferred cyanurate/isocyanurate compounds include salts/adducts of the triazine compounds with cyanuric acid, such as melamine cyanurate and any mixtures of melamine salts.

Preferred guanidine compounds include guanidine; aminoguanidine; and the like; and their salts and adducts with boric acid, carbonic acid, phosphoric acid, nitric acid, sulfuric acid, and the like; and mixtures comprising at least one of the foregoing guanidine compounds.

The nitrogen-containing flame retardant can be present in the composition at 1 to 25 weight percent, based on the total weight of the composition. Within this range, it is preferred to use at least 5 weight percent, even more preferably at least 8 weight percent of the nitrogen-containing flame retardant. Also within this range, it is preferred to use up to 20 weight percent.

In a specific embodiment, it has been found advantageous to use from 1 to 25 wt. % of a melamine polyphosphate, melamine cyanurate, melamine pyrophosphate, and/or melamine phosphate, based on the total weight of the composition. Particularly good results are obtained using from 1 to 25 wt. % of a melamine polyphosphate and/or melamine cyanurate, specifically 8 to 20 wt. % of melamine polyphosphate and/or melamine cyanurate, based on the total weight of the composition.

The nitrogen-containing flame-retardants are used in combination with one or more phosphinic acid salts. The phosphinates and diphosphinates include those set forth in U.S. Pat. No. 6,255,371 to Schosser et al. The specification of this patent, column 1, line 46 to column 2 line 4 is incorporated by reference into the present specification. Specific phosphinates mentioned include aluminum diethylphosphinate (DEPAL), and zinc diethylphosphinate (DEPZN). The phosphinates have the formula (I) $[(R^1)(R^2)(PO)-O]_m^- M^{m+}$ and formula II $[(O-POR^1)(R^3)(POR^2-O)]^{2-}_n M^{m+}_x$, and/or polymers comprising such formula I or II, wherein $R^1$ and $R^2$ are identical or different and are H, $C_1$-$C_6$ alkyl, linear or branched, or $C_6$-$C_{10}$ aryl; and $R^3$ is $C_1$-$C_{10}$, alkylene, linear or branched, $C_6$-$C_{10}$ arylene, $C_7$-$C_{11}$ alkylarylene, or $C_7$-$C_{11}$ arylalkylene; M is an alkaline earth metal, alkali metal, Al, Ti, Zn, Fe, or boron; m is 1, 2, 3 or 4; n is 1, 2, or 3; and x is 1 or 2. In one embodiment $R^1$ and $R^2$ are the same and are $C_1$-$C_6$-alkyl, linear or branched, or phenyl; $R^3$ is $C_1$-$C_{10}$-alkylene, linear or branched, $C_6$-$C_{10}$-arylene, -alkylarylene or -arylalkylene; M is magnesium, calcium, aluminum, zinc, or a combination thereof; m is 1, 2 or 3; n is 1, 2 or 3; and x is 1 or 2. The structures of formula I and II are specifically incorporated by reference from the Schosser patent into the present application. Note that $R^1$ and $R^2$ can be H, in addition to the substituents referred to set forth in the patent. This results in a hypophosphite, a subset of phosphinate, such as calcium hypophosphite, aluminum hypophosphite, and the like.

In a specific embodiment M is aluminum, and the composition comprises from 5 to 35 wt. %, specifically from 7 to 20 wt. % of a flame retardant phosphinate of the formula (Ia)

a flame retardant diphosphinate of the formula (IIa)

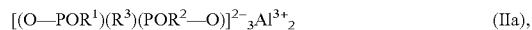

and/or a flame retardant polymer comprising formula (Ia) or (IIa), wherein $R^1$ and $R^2$ are identical or different and are H, $C_1$-$C_6$ alkyl, linear or branched, or $C_6$-$C_{10}$ aryl; and $R^3$ is $C_1$-$C_{10}$, alkylene, linear or branched, $C_6$-$C_{10}$ arylene, $C_7$-$C_{11}$ alkylarylene, or $C_7$-$C_{11}$ arylalkylene.

The molding composition also comprises from greater than zero to about 50 wt. %, based on the weight of the entire composition, of a reinforcing fiber having a non-circular cross-section. Any rigid fiber can be used, for example, glass fibers, carbon fibers, metal fibers, ceramic fibers or whiskers, and the like. In particular flat glass fibers are employed in an amount from about 10 wt. % to about 40 wt. %, or about 10 wt. % to about 30 wt. % based on the weight of the entire composition. Preferred flat glass fibers typically have a modulus of greater than or equal to about 6,800 megaPascals, and can be chopped or continuous. The flat glass fiber can have various cross-sections, for example, trapezoidal, rectangular, or square, crescent, bilobal, trilobal, and hexagonal.

In preparing the molding compositions it is convenient to use a glass fiber in the form of chopped strands having an average length of from 0.1 mm to 10 mm, and having an average aspect ratio of 2 to 5. In articles molded from the compositions on the other hand shorter lengths will typically be encountered because during compounding considerable fragmentation can occur.

In some applications it can be desirable to treat the surface of the fiber with a chemical coupling agent to improve adhesion to a thermoplastic resin in the composition. Examples of useful coupling agents are alkoxy silanes and alkoxy zirconates. Amino, epoxy, amide, or thio functional alkoxy silanes are especially useful. Fiber coatings with high thermal stability are preferred to prevent decomposition of the coating, which could result in foaming or gas generation during processing at the high melt temperatures required to form the compositions into molded parts. In one embodiment, no round glass fibers are present in the compositions. In another embodiment, only a flat glass fiber is present as a filler component.

In still other embodiments, the compositions can additionally comprise a non-fibrous inorganic filler, which can impart additional beneficial properties to the compositions such as thermal stability, increased density, stiffness, and/or texture. Typical non-fibrous inorganic fillers include, but are not limited to, alumina, amorphous silica, alumino silicates, mica, clay, talc, glass flake, glass microspheres, metal oxides such as titanium dioxide, zinc sulfide, ground quartz, and the like. In various embodiments the amount of non-fibrous filler can be in a range of between about 1 wt. % and about 50 wt. % based on the weight of the entire composition.

In some embodiments, combinations of glass fibers, carbon fibers, or ceramic fibers with a flat, plate-like filler, for example mica or flaked glass, can give enhanced properties. Typically, the flat, plate-like filler has a length and width at least ten times greater than its thickness, where the thickness is from 1 to about 1000 microns. Combinations of rigid fibrous fillers with flat, plate-like fillers can reduce warp of the molded article.

In one embodiment, the fibrous reinforcing filler consists essentially of flat glass fibers. In another embodiment, the fibrous reinforcing filler consists of flat glass fibers, i.e., the only fibrous reinforcing filler present is the flat glass fibers.

The molding composition can optionally comprise a charring polymer. A charring polymer is a polymer that has not more than 85% weight loss at 400° C. to 500° C. upon heating under nitrogen using a thermogravimetric analysis (TGA) at a heating rate of 20° C. per minute. Typical charring polymers include polyetherimides, poly(phenylene ether), poly(phenylenesulfide), polysulphones, polyethersulphones, poly(phenylenesulphide oxide) (PPSO), and polyphenolics (e.g., novolacs). The charring polymer can be present in an amount from 0.1 to 15 percent by weight of the composition. In a specific embodiment, a polyetherimide is used, specifically an aromatic polyetherimide. When present, the polyetherimide can be present in an amount from more than 0 to 25 wt. %, specifically 0.1 to 25 wt. %, even more specifically from 2 to 8 wt. %, each based on the total weight of the composition. The presence of a polyetherimide in compositions comprising aluminum phosphinate salts can further improve the mechanical properties of the compositions, in particular tensile strength and impact properties. High temperature molding stability can also be further improved, as well as melt stability. In one embodiment, the composition includes more than 0 to less than 10 wt % of a polyetherimide, based on the total weight of the composition. In a unique advantage of the current compositions, improvement in flexural modulus, notched and unnotched Izod impact strength, tensile stress at break and/or elastic modulus is observed when the composition comprises no charring polymer, in particular no polyetherimide.

The composition can further comprise one or more anti-dripping agents, which prevent or retard the resin from dripping while the resin is subjected to burning conditions. Specific examples of such agents include silicone oils, silica (which also serves as a reinforcing filler), asbestos, and fibrillating-type fluorine-containing polymers. Examples of fluorine-containing polymers include fluorinated polyolefins such as, for example, poly(tetrafluoroethylene), tetrafluoroethylene/hexafluoropropylene copolymers, tetrafluoroethylene/ethylene copolymers, poly(vinylidene fluoride), poly(chlorotrifluoroethylene), and the like, and mixtures comprising at least one of the foregoing anti-dripping agents. A preferred anti-dripping agent is poly(tetrafluoroethylene) encapsulated by a styrene: acrylonitrile (SAN) copolymer. When used, an anti-dripping agent is present in an amount of 0.02 to 2 weight percent, and more preferably from 0.05 to 1 weight percent, based on the total weight of the composition.

With the proviso that flame retardance properties and mechanical properties such as impact strength, tensile modulus and flexural modulus are not adversely affected, the compositions may, optionally, further comprise other conventional additives used in polyester polymer compositions such as non-reinforcing fillers, stabilizers such as antioxidants, thermal stabilizers, radiation stabilizers, and ultraviolet light absorbing additives, mold release agents, plasticizers, quenchers, lubricants, antistatic agents and processing aids. Other ingredients, such as dyes, pigments, laser marking additives, and the like can be added for their conventionally employed purposes. A combination comprising one or more of the foregoing or other additives can be used.

In an advantageous feature, the composition possesses good flame retardancy substantially in the absence of a halogenated, in particular a chlorinated and/or brominated organic flame retardant compound. In one embodiment, the compositions comprise 0 to 5 wt. % of a chlorinated and/or brominated organic compound. In another embodiment, the compositions comprise 0 to less than 3 wt. % of a chlorinated and/or brominated organic compound. In still another embodiment, the compositions comprise less than 2000 ppm, less than 500 ppm, or less than 100 ppm of a chlorinated and/or brominated organic flame retardant compound.

Where it is important to make compositions having a light grey or a white appearance, a composition can further include a mixture of zinc sulfide and zinc oxide in sufficient amounts to produce a composition having a light grey appearance or a white appearance. The specific amounts of mixtures of zinc sulfide and zinc oxide can vary, depending on the application. In one embodiment, the zinc sulfide is present in an amount that is at least 3 weight percent, based on the total weight of the composition. In another embodiment, the zinc oxide is present in an amount that is at least 0.05 weight percent, based on the total weight of the composition. In another embodiment, the zinc sulfide is present in an amount ranging from 3 to 14 weight percent, based on the total weight of the composition. In another embodiment, the zinc oxide is present in an amount ranging from 0.05 to 14 weight percent, based on the total weight of the composition. The light gray or white composition can have LAB values that can vary. As further discussed below, the use of the mixture of zinc sulfide and zinc oxide produces a material of light gray or white appearance that does not emit an unpleasant odor that results from the formation of hydrogen sulfide.

The compositions can be prepared by blending the components of the composition, employing a number of procedures. In an exemplary process, the polyester component, phosphorous flame retardant, melamine component, glass fiber, and optional additives are put into an extrusion compounder with resinous components to produce molding pellets. The resins and other ingredients are dispersed in a matrix of the resin in the process. In another procedure, the ingredients and any reinforcing glass are mixed with the resins by dry blending, and then fluxed on a mill and comminuted, or extruded and chopped. The composition and any optional ingredients can also be mixed and directly molded, e.g., by injection or transfer molding techniques. Preferably, all of the ingredients are freed from as much water as possible. In addition, compounding should be carried out to ensure that the residence time in the machine is short; the temperature is carefully controlled; the friction heat is utilized; and an intimate blend between the resin composition and any other ingredients is obtained.

Preferably, the ingredients are pre-compounded, pelletized, and then molded. Pre-compounding can be carried out in conventional equipment. For example, after pre-drying the polyester composition (e.g., for four hours at 120° C.), a single screw extruder can be fed with a dry blend of the ingredients, the screw employed having a long transition section to ensure proper melting. Alternatively, a twin screw extruder with intermeshing co-rotating screws can be fed with resin and additives at the feed port and reinforcing additives (and other additives) can be fed downstream. In either case, a generally suitable melt temperature will be 230° C. to 300° C. The pre-compounded composition can be extruded and cut up into molding compounds such as conventional granules, pellets, and the like by standard techniques. The composition can then be molded in any equipment conventionally used for thermoplastic compositions, such as a Newbury or van Dorn type injection molding machine with conventional cylinder temperatures, at 230° C. to 280° C., and conventional mold temperatures at 55° C. to 95° C. The molded compositions provide an excellent balance of impact strength and flame retardancy.

In embodiments where the compositions are of a light grey or a white color, a composition can be made by a method that includes a method for the manufacture of a composition, which comprises blending the components of the composition and further includes that step of adding a mixture of zinc sulfide and zinc oxide in sufficient amounts (i) to produce a composition having a light grey or white appearance and (ii) to inhibit formation of hydrogen sulfide. Hydrogen sulfide emits an highly undesirable odor and inhibiting the formation of such gas makes the use of such a material highly useful. In one embodiment, the zinc sulfide is present in an amount ranging from 3 to 14 weight percent, based on the total weight of the composition. In another embodiment, the zinc oxide is present in an amount ranging from 0.05 to 14 weight percent, based on the total weight of the composition.

In particular, the compositions provide excellent flame retardancy when molded into either thick or thin components. One set of test conditions commonly accepted and used as a standard for flame retardancy is set forth in Underwriters Laboratories, Inc. Bulletin 94, which prescribes certain conditions by which materials are rated for self-extinguishing characteristics. Another set of conditions commonly accepted and used (especially in Europe) as a standard for flame retardancy is the Glow Wire Ignition Test (GWIT), performed according to the International standard IEC 695-2-1/2. A 0.8 mm thick molded sample comprising the composition can have a UL-94 flammability rating of V0. A 0.4 mm thick molded sample comprising the composition can also have a UL-94 flammability rating of V0.

A molded article comprising the composition has a melting viscosity of from 200 to 400 Pa·s, measured in accordance with ISO11443 at 250° C. and a shear rate of 645 1/s. The melting viscosity can be at least 5% lower than for the same composition having the same amount of circular glass fibers, each measured at 250° C. in accordance with ISO11443.

A molded article comprising the composition can have a flexural modulus of from 3000 MPa to 20000 MPa, measured in accordance with ASTM 790, and the flexural stress at break can be from 120 to 200 MPa, more specifically 130 to 190 MPa, measured in accordance with ASTM 790.

A molded article comprising the composition can have good impact properties, for example, an unnotched Izod impact strength from to 300 to 700 J/m, measured at 23° C. in accordance with ASTM D256. The unnotched Izod impact strength can be at least 20% higher than for the same composition having the same amount of circular glass fibers, each measured at 23° C. in accordance with ASTM D256.

A molded article comprising the composition can have a notched Izod impact strength from to 50 to 80 J/m, measured at 23° C. in accordance with ASTM D256. The notched Izod impact strength can be at least 3% higher than for the same composition having the same amount of circular glass fibers, each measured at 23° C. in accordance with ASTM D256.

A molded article comprising the composition can have a heat deflection temperature from 195° C. to 225° C., measured in accordance with ASTM D648 at 1.8 MPa.

The composition can further have good tensile properties. A molded article comprising the composition can have a tensile modulus of elasticity from 2000 MPa to 15000 MPa, measured in accordance with ASTM 790. A molded article comprising the composition can have a tensile elongation at break from 1 to 3%, measured in accordance with ASTM 790. A molded article comprising the composition can have a tensile stress at break from to 80 to 150 MPa, measured in accordance with ASTM 790.

The compositions also exhibit less warpage. A molded article comprising the composition has a warpage of from 5 to 20 mm, measured at 23° C. as molded. The warpage can be at least 20% lower than for the same composition having the same amount of circular glass fibers, each measured at 23° C. as molded. Further, a molded article comprising the composition has a warpage of from 5 to 20 mm, measured after being annealed at 70° C. for 48 Hrs. The warpage can be at least 15% lower than for the same composition having the same amount of circular glass fibers, each measured after being annealed at 70° C. for 48 Hrs.

In a specific embodiment, the compositions can have a combination of highly useful physical properties. For example, a molded article comprising the composition can have an unnotched Izod impact strength of equal to 300 to 700 J/m, measured at 23° C. in accordance with ASTM D256 and a heat deflection temperature from 195° C. to 225° C., measured in accordance with ASTM D648 at 1.82 MPa; and a 0.8 mm thick molded sample comprising the composition can have a UL-94 flammability rating of V0.

One or more of the foregoing properties can be achieved by a composition that consists essentially of a modified poly(1,4-butylene terephthalate); a flame retardant phosphinate of the formula (Ia), (IIa), and/or a flame retardant polymer derived from formula (Ia) or (IIa); melamine polyphosphate and/or melamine cyanurate; a reinforcing flat glass fiber filler having a non-circular cross-section; and an optional additive selected from the group consisting of a mold release agent, an antioxidant, a thermal stabilizer, an antioxidant, and a UV stabilizer. In particular, the foregoing composition achieves good flame retardancy for samples having a thickness of 0.4 and 0.8 mm, and good impact and tensile strength. Better high temperature molding stability and melt stability are also seen.

In an even more specific embodiment, the composition consists essentially of, based on the total weight of the composition: from 20 to 90 wt. % of a modified poly(butylene terephthalate) copolymer that (1) is derived from poly(ethylene terephthalate) component selected from the group consisting of poly(ethylene terephthalate) and poly(ethylene terephthalate) copolymers and (2) that has at least one residue derived from the poly(ethylene terephthalate) component; from 5 to 35 wt. % of a flame retardant phosphinate of the formula (Ia), a flame retardant diphosphinate of the formula (IIa),

(Ia),

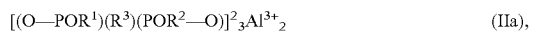

(IIa), and/or a flame retardant polymer derived from formula (I) or (II), wherein $R^1$ and $R^2$ are identical or different and are H, $C_1$-$C_6$ alkyl, linear or branched, or $C_6$-$C_{10}$ aryl; and $R^3$ is $C_1$-$C_{10}$, alkylene, linear or branched, $C_6$-$C_{10}$ arylene, $C_7$-$C_{11}$ alkylarylene, or $C_7$-$C_{11}$ arylalkylene; from 1 to 25 wt. % of melamine polyphosphate and/or melamine cyanurate; from 1 to 55 wt. % of a glass fiber having a flat cross-section; and from 0.1 to 5 wt. % of an additive selected from the group consisting of a mold release agent, an antioxidant, a thermal stabilizer, an antioxidant, and a UV stabilizer; wherein the components have a combined total weight of 100 wt. %, and wherein the at least one residue derived from the poly(ethylene terephthalate) component comprises mixtures of ethylene glycol and diethylene glycol groups and wherein a 0.8 mm thick molded sample comprising the composition has a UL-94 flammability rating of V0.

In a still more specific embodiment, the composition consists essentially of, based on the total weight of the composition: from 20 to 90 wt. % of a modified poly(butylene terephthalate) copolymer that (1) is derived from poly(ethylene terephthalate) component selected from the group consisting of poly(ethylene terephthalate) and poly(ethylene terephthalate) copolymers and (2) that has at least one residue derived from the poly(ethylene terephthalate) component; from 5 to 25 wt. % of a flame retardant phosphinate of the formula (Ia), a flame retardant diphosphinate of the formula (IIa)

(Ia),

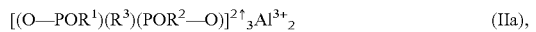

(IIa), and/or a flame retardant polymer derived from formula (I) or (II), wherein $R^1$ and $R^2$ are identical or different and are H, $C_1$-$C_6$ alkyl, linear or branched, or $C_6$-$C_{10}$ aryl; and $R^3$ is $C_1$-$C_{10}$, alkylene, linear or branched, $C_6$-$C_{10}$ arylene, $C_7$-$C_{11}$ alkylarylene, or $C_7$-$C_{11}$ arylalkylene; from 1 to 15 wt. % of melamine polyphosphate and/or melamine cyanurate; from 1 to 45 wt. % of a glass fiber having a flat cross-section; and from 0.1 to 5 wt. % of an additive selected from the group consisting of a mold release agent, an antioxidant, a thermal stabilizer, an antioxidant, and a UV stabilizer; wherein the components and have a combined total weight of 100 wt. %; and wherein the at least one residue derived from the poly(ethylene terephthalate) component comprises mixtures of ethylene glycol and diethylene glycol groups wherein the composition contains less than 900 ppm of a halogen selected from the group consisting of bromine, chlorine, and combinations thereof; and a 0.8 mm thick molded sample comprising the composition has a UL-94 flammability rating of V0.

Also disclosed are molded articles comprising the composition, such as electric and electronic parts, including, for example, connectors, circuit breakers, lamp holders, fusers, power distribution box, enclosures, and power plugs. A method of forming an article comprises shaping by extruding, calendaring, or molding the composition to form the article. Injection molded articles are specifically mentioned, for example an injection molded connector. Other articles include fans, e.g., fans used in electronic devices such as computers.

It should be clear that the compositions and articles disclosed herein can include reaction products of the above described components used in forming the compositions and articles.

Advantageously, a molding composition containing the modified poly(butylene terephthalate) copolymers can have a reduced $CO_2$ emissions index. The reduced $CO_2$ emissions index, as defined in this application, is the amount of $CO_2$, expressed in kg, that is saved when one (1) kg of a composition containing the modified poly(butylene terephthalate) copolymers is made, as compared to the amount of $CO_2$, expressed in kg, that is created when the composition is made with poly(butylene terephthalate) that is derived from monomers. Generally, our compositions generally have a reduced $CO_2$ emissions index that is more than approximately 0.06 kg, and can range from 0.06 kg to 2.25 kg.

The basis for this feature is discussed below. The difference between the amount of $CO_2$ that is created during ordinary processes for making virgin, monomer-derived PBT and the process for making 1 kg of the modified poly(butylene terephthalate) copolymers can range from 1.3 kg to 2.5 kg, or more suitably from 1.7 kg to 2.2 kg. It should be noted that this difference is based on calculations for the entire process that starts from crude oil to the monomers to the PBT versus scrap PET to oligomers to the modified PBT. In other words, the process for making 1 kg of the modified poly(butylene terephthalate) copolymers creates 1.3 to 2.5 kilograms less $CO_2$ as compared to the process for making 1 kg of virgin PBT from crude oil. To determine the ranges of the reduced $CO_2$ emissions index for our compositions (which have the modified PBT copolymers present in an amount ranging from 5 to 90 wt. %), the $CO_2$ reduction index can be calculated by multiplying the lower amount of the poly(butylene terephthalate) present in the composition, in percentage terms, with 1.3 (0.05×1.3=0.065) and the higher amount of the poly(butylene terephthalate) times 2.5. (0.90×2.5=2.25).

These results can be derived and verified by using material and energy balance calculations (calculations that are well known in the chemical engineering art) and comparing the amount of energy used to make modified PBT copolymers from PET and the amount of energy used to make PBT from terephthalic acid.

Advantageously, our invention now provides previously unavailable benefits. Our invention provides thermoplastic polyesters composition containing modified polybutylene terephthalate copolymers made from post-consumer or post-industrial PET, which having a combination of desirable flame retardance and mechanical properties. Our compositions can further have useful mechanical properties, in particular impact strength, tensile properties, and/or heat stability. The compositions can optionally comprise a charring polymer, for example, a polyetherimide, to further improve mechanical strength and flame retardance. Such materials have many applications in the electronics industry.

The invention is further illustrated by the following non-limiting examples.

EXAMPLES

The following materials in Table 1 were used in the examples that follow.

with a vacuum vented mixing screw, at a barrel and die head temperature between 240° C. and 265° C. and a screw speed of 300 rpm. The extrudate was cooled through a water bath prior to pelletizing. ASTM Izod and flexural bars were injection molded on a van Dorn molding machine with a set temperature of approximately 240° C. to 265° C. The pellets were dried for 3 hours to 4 hours at 120° C. in a forced air-circulating oven prior to injection molding.

Notched and un-notched Izod testing was performed on 75 mm×12.5 mm×3.2 mm bars in accordance with ASTM D256. Bars were notched prior to mechanical property testing and were tested at 23° C. Flexural properties were measured in accordance with ASTM 790 on molded samples having a thickness of 3.2 mm. Tensile properties were measured in accordance with ASTM 790 on molded samples having a thickness of 3.2 mm. Heat deflection temperature was measured on molded samples having a thickness of 3.2 mm in accordance with ASTM 648. Melt viscosity was measured in accordance with ISO11443 at 250° C. Warpage was measured on molded samples having a thickness of 1.6 mm in accordance with the following method.

TABLE 1

| Abbreviation | Description | Source |
|---|---|---|
| VALOX IQ-PBT-1 | intrinsic viscosity = 1.19 dl/g, weight-average molecular weight = 110000 g/mol | SABIC Innovative Plastics Company |
| VALOX IQ-PBT-2 | intrinsic viscosity = 0.66 dl/g, weight-average molecular weight = 53400 g/mol | SABIC Innovative Plastics Company |
| Regular glass | Standard 13 micron PBT glass (Glass fiber with round cross-section) | PPG Industries |
| Flat glass | Flat glass fiber: cross section area equal to a round glass fiber with a diameter of 14 micrometers; flat ratio = 4; Fiber length = 3 mm | Nitto Boseki |
| MPP | Melamine polyphosphate | Ciba Specialty |
| Al-DPA | Aluminum diethyl phosphinic acid | Clariant |
| PEI | Polyetherimide (ULTEM 1010) | SABIC Innovative Plastics Company |
| FR | Brominated FR master batch | SABIC Innovative Plastics Company |
| TSAN | SAN-encapsulated PTFE | SABIC Innovative Plastics Company |
| AO | Hindered phenol stabilizer | Ciba Specialty |
| PETS | Pentaerythritol tetrastearate | Faci SpA |
| ZnP | Zinc Phosphate | Halox Pigments |
| Talc | ULTRATALC ™ 609 having a median particle size of less than 0.9 microns | Barretts Minerals, Inc. |

Examples E1 to E2 and Comparative Examples C1 to C3

The purpose of these examples was to compare the performance of compositions of our invention containing flat glass fiber to compositions containing regular glass fibers (fibers containing a circular cross section). The composition used in Examples E1 and E2 exemplified an embodiment of our invention while compositions in Examples C1, C2, and C3 were used for comparison.

The ingredients as shown in Tables 2 to 4 were tumble blended and then extruded on a 27 mm twin screw extruder Warpage was measured on molded samples having a thickness of 1.6 mm in accordance with the following method: (a) place the specimen on a flat surface with the knockout pin or cavity dimension side up; (b) hold the calibrated steel ruler in a vertical position behind the specimen; (c) while watching the ruler, press around the edge of the specimen and identify the maximum distance from the flat surface. This is the warp of the specimen; (d) measure and record the specimen's warp to the nearest millimeter.

Results are shown in Table 2.

TABLE 2

|  | Unit | E1 | E2 | C1 | C2 | C3 |
|---|---|---|---|---|---|---|
| VALOX IQ PBT-1 | % | 25.82 | 23.32 | 26.23 | 25.82 | 23.32 |
| VALOX IQ PBT-2 | % | 25.82 | 23.32 | 26.23 | 25.82 | 23.32 |
| Regular Glass | % | — | — | 30 | 30 | 30 |
| Flat Glass | % | 30 | 30 | — | — | — |
| MPP | % | 5 | 5 | — | 5 | 5 |
| Al-DNP | % | 12.5 | 12.5 | — | 12.5 | 12.5 |
| PEI | % | — | 5 | — | — | 5 |
| FR | % | — | — | 15.45 | — | — |

TABLE 2-continued

|  | Unit | E1 | E2 | C1 | C2 | C3 |
|---|---|---|---|---|---|---|
| TSAN | % | 0.5 | 0.5 | 1.05 | 0.5 | 0.5 |
| AO | % | 0.15 | 0.15 | 0.04 | 0.15 | 0.15 |
| PETS | % | 0.2 | 0.2 | 0.2 | 0.2 | 0.2 |
| Zn—P | % | — | — | 0.3 | — | — |
| Talc | % | — | — | 0.5 | — | — |
| Total | | 100 | 100 | 100 | 100 | 100 |
| Properties | | | | | | |
| Melt Viscosity at 645 1/s shear | Pa·s | 328.7 | 376.8 | 250.7 | 346 | 401.2 |
| Flexural Modulus | MPa | 10300 | 11000 | 9410 | 10200 | 10500 |
| Flexural Stress at Break | MPa | 173 | 182 | 177 | 163 | 168 |
| HDT | °C. | 207.3 | 204.1 | 194.7 | 204 | 199.6 |
| Notched IZOD Impact | J/m | 70.4 | 76.4 | 61.6 | 56.4 | 50.9 |
| Unnotched IZOD Impact | J/m | 644 | 626 | 612 | 497 | 487 |
| Modulus of Elasticity | MPa | 13100 | 14000 | 12000 | 13100 | 13100 |
| Tensile Stress at Break | MPa | 104 | 101 | 102 | 99.8 | 95.8 |
| Tensile Elongation at Break | % | 1.6 | 1.2 | 1.3 | 1.7 | 1.3 |
| Warpage-As Molded | mm | 11 | 6.6 | 22 | 27 | 20 |
| Warpage-Annealed | mm | 13 | 7.4 | 24 | 30 | 26 |
| UL-94 at 0.80 mm | | V0 | — | — | — | — |

The results in Table 2 demonstrate the advantages of flat glass as a filler, including improved the mechanical properties, flow, and dimensional stability, as compared to compositions comprising regular glass having a circular cross-section.

As shown in Table 2, C1 is a halogen FR, 30 wt % regular glass filled formulation, C2 is a non-halogenated FR, 30 wt % regular glass formulation, C3 is a non-halogenated FR, 30 wt % regular glass and 5 wt % Ultem-1010 (polyetherimide) formulation. E1 is a non-halogenated FR, 30% flat glass filled formulation without Ultem-1010. E2 is a non-halogenated FR, 30% flat glass filled formulation with Ultem-1010.

The effects of flat glass fiber on mechanical properties, flow, and dimensional stability could be seen clearly from the comparison among the 5 examples. In non-halogenated FR formulations alone, by replacing regular glass (C2 and C3) with flat glass (E1 and E2), mechanical properties including notched and un-notched impact strength, tensile strength, and flexural strength were improved by between 5 to 30%. Dimensional stability, expressed in warpage in this case, was also improved by more than 100% with presence of flat glass fiber in the formulation (E1 and E2). Flat glass containing non-halogenated FR formula (E1 and E2) shows improvement in flow by 5%, as compared with both regular glass fiber non-halogenated FR formulas (C2 and C3).

Flat glass fiber formulations with non-halogenated FR (E1 and E2) also displayed comparable tensile strength and flexural stress or improved notched and un-notched impacted strength, flexural modulus, HDT, and dimensional stability compared with the 30% regular glass filled halogenated FR formulation (C1).

Examples E3 and C4 to C5

The purpose of these examples was to compare the performance of compositions of our invention containing flat glass fiber to compositions containing regular glass fibers (fibers containing a circular cross section). The composition used in Example E3 exemplified an embodiment of our invention while compositions in Examples C4 and C5 were used for comparison.

The formulation procedure of example E1 was followed using the materials and quantities listed in Table 3, to form 25 wt. % glass filled flame retardant VALOX IQ PBT resins. Physical property testing results are also shown in Table 3.

TABLE 3

|  | Units | E3 | C4 | C5 |
|---|---|---|---|---|
| Component | | | | |
| VALOX IQ PBT-1 | % | 25.825 | 28.73 | 25.825 |
| VALOX IQ PBT-2 | % | 25.825 | 28.73 | 25.825 |
| Regular Glass | % | — | 25 | 25 |
| Flat Glass | % | 25 | | |
| MPP | % | 5 | | 5 |
| Al-DNP | % | 12.5 | | 12.5 |
| PEI | % | 5 | | 5 |
| FR | % | — | 15.45 | — |
| TSAN | % | 0.5 | 1.05 | 0.5 |
| AO | % | 0.15 | 0.04 | 0.15 |
| PETS | % | 0.2 | 0.2 | 0.2 |
| Zn—P | % | — | 0.3 | — |
| Talc | % | — | 0.5 | — |
| Total | | 100 | 100 | 100 |
| Properties | | | | |
| Melt Viscosity at 645 1/s shear rate | Pa·s | 341.6 | 232.3 | 361.1 |
| Flexural Modulus | MPa | 9450 | 8210 | 8800 |
| Flexural Stress at Break | MPa | 170 | 170 | 157 |
| HDT | °C. | 203.2 | 193.6 | 196.6 |
| Notched IZOD Impact Strength | J/m | 67.6 | 58 | 49.3 |
| Unnotched IZOD Impact Strength | J/m | 536 | 615 | 517 |
| Modulus of Elasticity | MPa | 12100 | 11100 | 11000 |
| Tensile Stress at Break | MPa | 100 | 109 | 97.5 |
| Tensile Elongation at Break | % | 1.5 | 1.8 | 1.8 |
| Warpage-As Molded | mm | 9.2 | 21 | 12 |
| Warpage-Annealed | mm | 11 | 24 | 20 |

The results in Table 3 again demonstrate, improved mechanical properties, flow, and dimensional stability attributable to the flat glass filler.

As shown in Table 3, E3 is a non-halogenated FR, 25 wt. % flat glass filled, and 5 wt. % PEI-filled formulation. C4 is a 25 wt. % glass filled halogenated based FR formulation, and C5 is a non-halogenated FR, 25 wt. % regular glass filled formulation with PEI.

In non-halogenated FR formulations, by replacing regular glass fiber (C5) with flat glass fiber (E3), mechanical properties including notched and un-notched impact strength, and flexural strength were improved by between 4% to 30%. Dimensional stability, expressed in warpage in this case, was also improved by more than 30% with the presence of flat glass fiber in the formulation (E3). Flat glass containing non-halogenated FR formula (E3) shows improvement in flow by 6%, as compared with the regular glass fiber non-halogenated FR formula (C5).

The flat glass fiber, non-halogenated FR formulation (E3) has comparable flexural stress and improved un-notched impacted strength, flexural modulus, HDT, and dimensional stability compared with 25 wt. % regular glass filled halogen FR formulation (C4).

Examples E4 and C6 to C7

The purpose of these examples was to compare the performance of compositions of our invention containing flat glass fiber to compositions containing regular glass fibers (fibers containing a circular cross section). The composition used in Example E4 exemplified an embodiment of our invention while compositions in Examples C6 and C7 were used for comparison.

The formulation procedure for example E1 was followed using the materials listed in Table 4 to form 15 wt. % glass filled flame retardant VALOX IQ PBT resins. As shown in Table 4, E4 is a non-halogenated FR, 15 wt. % flat glass filled formulation. C6 is a 15 wt. % glass filled halogenated based FR formulation, and C7 is a non-halogenated FR, 15 wt. % regular glass filled formulation. Testing results are also shown in Table 4.

TABLE 4

|  |  | E4 | C6 | C7 |
| --- | --- | --- | --- | --- |
| VALOX IQ PBT 1 | % | 33.325 | 33.73 | 33.325 |
| VALOX IQ PBT 2 | % | 33.325 | 33.73 | 33.325 |
| Regular Glass | % | — | 15 | 15 |
| Flat Glass | % | 15 | — | — |
| Melamine Polyphosphate | % | 5 | — | 5 |
| Aluminum diethyl Phosphinic acid | % | 12.5 | — | 12.5 |
| PEI | % | — | — | — |
| Brominated FR masterbatch | % | — | 15.45 | — |
| SAN encapsulated PTFE | % | 0.5 | 1.05 | 0.5 |
| Hindered phenol stabilizer | % | 0.15 | 0.04 | 0.15 |
| Pentaerythritol tetrastearate | % | 0.2 | 0.2 | 0.2 |
| Zinc Phosphate | % | — | 0.3 | — |
| Ultratalc | % | — | 0.5 | — |
| Formulation Total | | 100 | 100 | 100 |
| Properties | | | | |
| Melt Viscosity at 645 1/s shear rate | Pa · s | 246.9 | 198.7 | 274 |
| Flexural Modulus | MPa | 6730 | 5750 | 6390 |
| Flexural Stress at Break | MPa | 139 | 141 | 131 |
| HDT | ° C. | 200.1 | 184.5 | 192.2 |
| Notched IZOD Impact Strength | J/m | 54.5 | 40.2 | 39.4 |
| Unnotched IZOD Impact Strength | J/m | 390 | 255 | 305 |
| Modulus of Elasticity | MPa | 8580 | 7360 | 8440 |
| Tensile Stress at Break | MPa | 85.2 | 86.2 | 81.9 |
| Tensile Elongation at Break | % | 2.2 | 1.9 | 2.4 |
| Warpage-As molded | mm | 15 | 19 | 20 |
| Warpage-Annealed | Mm | 18 | 21 | 22 |

The results in Table 4 show that the use of flat glass filler at a 15 wt. % level also improved the mechanical properties, flow, and dimensional stability, as compared to compositions comprising regular glass having a circular cross-section.

In the non-halogenated FR formulations, replacing regular glass fiber (C7) with flat glass fiber (E4), mechanical properties were improved by 4% to 38%, including notched and un-notched impact strength, flexural strength, tensile strength, and HDT. Dimensional stability, expressed in warpage in this case, was also improved by about 20% with the presence of flat glass fiber in the formulation (E4). The flat glass, non-halogenated FR formula (E4) also shows improvement in flow by 10% over the regular glass fiber non-halogenated FR formulation C7. The flat glass fiber non-halogenated FR formulation (E4) also displayed comparable flexural strength and tensile strength, and improved un-notched and notched impacted strength, flexural modulus, HDT, and dimensional stability, compared with the 15 wt. % glass filled halogen FR formulation (C6).

While the invention has been described with reference to a preferred embodiment, it will be understood by those skilled in the art that various changes can be made and equivalents can be substituted for elements thereof without departing from the scope of the invention. In addition, many modifications can be made to adapt a particular situation or material to the teachings of the invention without departing from essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A composition comprising, based on the total weight of the composition:

from 20 to 90 wt. % of a polyester component comprising a modified poly(butylene terephthalate) copolymer, that (1) is derived from a poly(ethylene terephthalate) copolymer and (2) that has at least one residue derived from the poly(ethylene terephthalate) copolymer;

from 5 to 35 wt. % of a flame retardant phosphinate of the formula (I)

$$[(R^1)(R^2)(PO)-O]^-_m M^{m+} \quad (I)$$

a flame retardant diphosphinate of the formula (II)

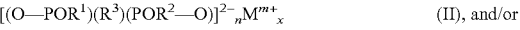

$$[(O-POR^1)(R^3)(POR^2-O)]^{2-}_n M^{m+}_x \quad (II), \text{and/or}$$

a flame retardant polymer derived from the flame retardant phosphinate of the formula (I) or the flame retardant diphosphinate of the formula (II), wherein $R^1$ and $R^2$ are identical or different and are H, $C_1$-$C_6$ alkyl, linear or branched, or $C_6$-$C_{10}$ aryl; M is an alkaline earth metal, alkali metal, Al, Ti, Zn, Fe, or boron; m is 1, 2, 3 or 4; n is 1, 2, or 3; and x is 1 or 2;

from 1 to 25 wt. % of a melamine polyphosphate, melamine cyanurate, melamine pyrophosphate, and/or melamine phosphate;

from greater than zero to 50 wt. % of a glass fiber having a non-circular cross-section; and from 0 to 5 wt. % of an additive selected from the group consisting of a mold release agent, an antioxidant, a thermal stabilizer, and a UV stabilizer;

wherein the at least one residue derived from the poly(ethylene terephthalate) copolymer comprises mixtures of ethylene glycol and diethylene glycol groups; and wherein a molded article comprising the composition has an unnotched Izod impact strength at least 20% higher than for the same composition having the same amount of circular glass fibers, each measured at 23° C. in accordance with ASTM D256.

2. The composition of claim 1, wherein a molded article comprising the composition has an unnotched Izod impact strength from 300 to 700 J/m, measured at 23° C. in accordance with ASTM D256.

3. The composition of claim 1, wherein a molded article comprising the composition has a notched Izod impact strength from 50 to 80 J/m, measured at 23° C. in accordance with ASTM D256.

4. The composition of claim 1, wherein a molded article comprising the composition has a notched Izod impact strength at least 3% higher than for the same composition having the same amount of circular glass fibers, each measured at 23° C. in accordance with ASTM D256.

5. The composition of claim 1, wherein a molded article comprising the composition has a tensile modulus of elasticity from 2000 MPa to 15000 MPa, measured in accordance with ASTM 790.

6. The composition of claim 1, wherein a molded article comprising the composition has a tensile stress at break from 80 to 150 MPa, measured in accordance with ASTM 790.

7. The composition of claim 1, wherein a molded article comprising the composition has a flexural modulus of 3000 MPa to 20000 MPa, measured in accordance with ASTM 790.

8. The composition of claim 1, wherein a molded article comprising the composition has a heat deflection temperature of from 195° C. to 230° C., measured in accordance with ASTM D648 at 1.82 MPa.

9. The composition of claim 1, wherein a 0.80 mm thick molded sample comprising the composition has a UL-94 flammability rating of V0.

10. The composition of claim 1, wherein a molded article comprising the composition has a melting viscosity of from 200 to 400 Pa·s, measured in accordance with ISO11443 at 250° C. and a shear rate of 645 1/s.

11. The composition of claim 1, wherein a molded article comprising the composition has a melting viscosity at least 5% lower than for the same composition having the same amount of circular glass fibers, each measured at 250° C. in accordance with ISO11443.

12. The composition of claim 1, wherein a molded article comprising the composition has a warpage of from 5 to 20 mm, measured at 23° C. as molded.

13. The composition of claim 1, wherein the composition contains less than 900 ppm of a halogen selected from the group consisting of bromine, chlorine, and combinations thereof.

14. The composition of claim 1, wherein a molded article comprising the composition has a warpage at least 20% lower than for the same composition having the same amount of circular glass fibers, each measured at 23° C. as molded.

15. The composition of claim 1, wherein a molded article comprising the composition has a warpage of from 5 to 20 mm, measured after annealed at 70° C. for 48 Hrs.

16. The composition of claim 1, wherein a molded article comprising the composition has a warpage at least 15% lower than for the same composition having the same amount of circular glass fibers, each measured after annealed at 70° C. for 48 Hrs.

17. The composition of claim 1, wherein the at least one residue derived from the poly(ethylene terephthalate) copolymer further comprises a member selected from the group consisting of isophthalic acid groups, antimony-containing compounds, germanium-containing compounds, titanium-containing compounds, cobalt-containing compounds, tin-containing compounds, aluminum, aluminum salts, 1,3-cyclohexane dimethanol isomers, 1,4-cyclohexane dimethanol isomers, alkaline earth metal salts, alkali salts, phosphorous-containing compounds and anions, sulfur-containing compounds and anions, naphthalene dicarboxylic acids, 1,3-propane diol groups, and combinations thereof.

18. The composition of claim 1, wherein the at least one residue derived from the poly(ethylene terephthalate) copolymer further comprises isophthalic acid groups.

19. The composition of claim 1, wherein the at least one residue derived from the poly(ethylene terephthalate) copolymer further comprises cobalt-containing compounds.

20. The composition of claim 19, wherein the at least one residue derived from the poly(ethylene terephthalate) copolymer further comprises isophthalic acid groups.

21. The composition of claim 2, wherein the modified poly(butylene terephthalate) copolymer is derived from a 1,4-butanediol that is derived from biomass.

22. The composition of claim 2, wherein the polyester component further comprises virgin poly(1,4-butylene terephthalate).

23. The composition of claim 1, wherein the polyester component further comprises a second polyester selected from the group consisting of poly(ethylene terephthalate), poly(1,4-butylene terephthalate), poly(ethylene naphthalate), poly(1,4-butylene naphthalate), (polytrimethylene terephthalate), poly(1,4-cyclohexanedimethylene, 1,4-cyclohexanedicarboxylate), poly(1,4-cyclohexanedimethylene terephthalate), poly(1,4-butylene-co-1,4-but-2-ene diol terephthalate), poly(cyclohexanedimethylene-co-ethylene terephthalate), and a combination thereof.

24. The composition of claim 23, wherein the second polyester is virgin poly(1,4-butylene terephthalate).

25. The composition of claim 1, wherein the glass fiber has a trapezoidal cross section.

26. The composition of claim 1, wherein the glass fiber has a rectangular cross-section.

27. The composition of claim 1, wherein the glass fiber has a square cross-section.

28. The composition of claim 1, wherein the glass fiber has an average aspect ratio of 2 to 5.

29. The composition of claim 1, wherein the glass fibers have an average length of 0.1 mm to 10 mm.

30. The composition of claim 1, wherein M is selected from the group consisting of magnesium, calcium, aluminum, zinc, and a combination thereof.

31. The composition of claim 1, wherein M is aluminum.

32. The composition of claim 1, wherein the flame retardant phosphinate of the formula (I) or of the formula (II) comprises an aluminum phosphinate.

33. The composition of claim 1, wherein the composition comprises no polyetherimide.

34. The composition of claim 1, wherein the composition comprises more than 0 to less than 10 wt % of a polyetherimide, based on the total weight of the composition.

35. The composition of claim 1, wherein the composition comprises an antidrip agent.

36. The composition of claim 1, wherein the composition further comprises an additive selected from the group consisting of a lubricant, a quencher, a plasticizer, an antistatic agent, a dye, a pigment, a laser marking additive, a radiation stabilizer, and a combination thereof.

37. The composition of claim 1, wherein the composition comprises from more than 0 to less than 5 wt. % of a chlorinated organic compound and/or a brominated organic compound.

38. A composition consisting essentially of, based on the total weight of the composition:
from 20 to 90 wt. % of a modified poly(butylene terephthalate) copolymer that (1) is derived from a poly(ethylene terephthalate) copolymer and (2) that has at least one residue derived from the poly(ethylene terephthalate) copolymer;

from 5 to 35 wt. % of
a flame retardant phosphinate of the formula (Ia)

  (Ia), a flame retardant diphosphinate of the formula (IIa)

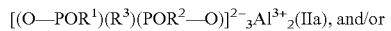(IIa), and/or a flame retardant polymer derived from formula (I) or (II), wherein $R^1$ and $R^2$ are identical or different and are H, $C_1$-$C_6$ alkyl, linear or branched, or $C_6$-$C_{10}$ aryl; and $R^3$ is $C_1$-$C_{10}$, alkylene, linear or branched, $C_6$-$C_{10}$ arylene, $C_7$-$C_{11}$ alkylarylene, or $C_7$-$C_{11}$ arylalkylene;

from 1 to 25 wt. % of melamine polyphosphate and/or melamine cyanurate;

from greater than 0 to 50 wt. % of a glass fiber having a flat cross-section; and from 0 to 5 wt. % of an additive selected from the group consisting of a mold release agent, an antioxidant, a thermal stabilizer, and a UV stabilizer;

wherein the composition contains less than 900 ppm of a halogen selected from the group consisting of bromine, chlorine, and combinations thereof;

wherein the components have a combined total weight of 100 wt. %, wherein the at least one residue derived from the poly(ethylene terephthalate) copolymer comprises mixtures of ethylene glycol and diethylene glycol groups; and wherein a 0.8 mm thick molded sample comprising the composition has a UL-94 flammability rating of V0; and wherein a molded article comprising the composition has an unnotched Izod impact strength at least 20% higher than for the same composition having the same amount of circular glass fibers, each measured at 23° C. in accordance with ASTM D256.

39. A composition consisting essentially of, based on the total weight of the composition:

from 20 to 90 wt. % of a modified poly(butylene terephthalate) copolymer that (1) is derived from a poly(ethylene terephthalate) copolymer and (2) that has at least one residue derived from the poly(ethylene terephthalate) copolymer;

from 5 to 25 wt. % of
a flame retardant phosphinate of the formula (Ia)

  (Ia), a flame retardant diphosphinate of the formula (IIa)

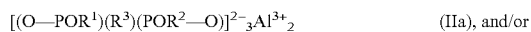  (IIa), and/or a flame retardant polymer derived from formula (I) or (II), wherein $R^1$ and $R^2$ are identical or different and are H, $C_1$-$C_6$ alkyl, linear or branched, or $C_6$-$C_{10}$ aryl; and $R^3$ is $C_1$-$C_{10}$, alkylene, linear or branched, $C_6$-$C_{10}$ arylene, $C_7$-$C_{11}$ alkylarylene, or $C_7$-$C_{11}$ arylalkylene;

from 1 to 15 wt. % of melamine polyphosphate and/or melamine cyanurate;

from greater than 0 to 45 wt. % of a glass fiber having a flat cross-section; and from 0 to 5 wt. % of an additive selected from the group consisting of a mold release agent, an antioxidant, a thermal stabilizer, and a UV stabilizer;

wherein the components have a combined total weight of 100 wt. %; and wherein the at least one residue derived from the poly(ethylene terephthalate) copolymer comprises mixtures of ethylene glycol and diethylene glycol groups;

wherein the composition contains less than 900 ppm of a halogen selected from the group consisting of bromine, chlorine, and combinations thereof; and wherein a 0.8 mm thick molded sample comprising the composition has a UL-94 flammability rating of V0; and wherein a molded article comprising the composition has an unnotched Izod impact strength at least 20% higher than for the same composition having the same amount of circular glass fibers, each measured at 23° C. in accordance with ASTM D256.

40. A method for the manufacture of a composition, comprising blending the components of the composition of claim 1.

41. An article comprising the composition of claim 1.

42. The article of claim 41, wherein the article is an injection molded article.

43. A method of forming an article comprising shaping by extruding, calendaring, or molding the composition of claim 1 to form the article.

44. The composition of claim 1, wherein the ethylene glycol groups are present in an amount from 0.1 to 10 mole %, based on the total moles of diol in the modified poly(butylene terephthalate) copolymer.

45. The composition of claim 1, wherein the diethylene glycol groups are present in an amount from 0.1 to 10 mole %, based on the total moles of diol in the modified poly(butylene terephthalate) copolymer.

46. The composition of claim 18, wherein the isophthalic acid groups are present in an amount from 0.1 to 10 mole %, based on the total moles of diacid/diester in the modified poly(butylene terephthalate) copolymer.

47. The composition of claim 18, wherein the ethylene glycol groups, diethylene glycol groups, and isophthalic acid groups are present in an amount from more than 0 to less than or equal to 23 equivalents, relative to the total of 100 equivalents of diol groups and 100 equivalents of diacid groups in the modified poly(butylene terephthalate) copolymer.

48. The composition of claim 21, wherein the biomass is selected from the group consisting of grains and cellulosic materials.

49. The composition of claim 1, wherein the modified poly(butylene terephthalate) copolymer has a $CO_2$ reduction index of 1.3 to 2.5 kg.

* * * * *